United States Patent [19]

Marshall

[11] Patent Number: 5,056,367
[45] Date of Patent: Oct. 15, 1991

[54] ULTRASONIC LINEAR MEASUREMENT SYSTEM

[75] Inventor: Scot H. Marshall, Slidell, La.

[73] Assignee: Martin Marietta Corporation, Bethesda, Md.

[21] Appl. No.: 329,939

[22] Filed: Mar. 29, 1989

[51] Int. Cl.$^5$ .............................................. G01H 5/00
[52] U.S. Cl. .................................. 73/597; 73/1 DV; 73/1 J; 367/127
[58] Field of Search ................. 73/597, 598, 622, 637, 73/638, 1 DV, 1 J; 367/127

[56] References Cited

U.S. PATENT DOCUMENTS

| | | | |
|---|---|---|---|
| 3,299,696 | 1/1967 | Dickinson, III | 73/71.5 |
| 3,720,098 | 3/1973 | Dixon | 73/597 |
| 3,896,662 | 7/1975 | Camp et al. | 73/67.8 S |
| 4,049,954 | 9/1977 | Da Costa Vieira et al. | 235/151.32 |
| 4,234,942 | 11/1980 | Prause et al. | 367/128 |
| 4,386,527 | 6/1983 | Maucher | 73/597 |
| 4,539,847 | 9/1985 | Paap | 73/579 |
| 4,567,747 | 2/1986 | Matay | 73/1 DV |
| 4,630,226 | 12/1986 | Tanaka | 364/560 |

FOREIGN PATENT DOCUMENTS 54-99665  8/1979  Japan ...................................... 73/622

OTHER PUBLICATIONS

Igor Aleksandrovich Viktorov, *Rayleigh and Lamb Waves*, (Plenum Press: New York), 1967, pp. 1, 67, 92 and 93.

*Primary Examiner*—John E. Chapman
*Attorney, Agent, or Firm*—Pravel, Gambrell, Hewitt, Kimball & Krieger

[57] ABSTRACT

An ultrasonic linear measurement system uses the travel time of surface waves along the perimeter of a three-dimensional curvilinear body to determine the perimeter of the curvilinear body. The system can also be used piece-wise to measure distances along plane surfaces. The system can be used to measure perimeters where use of laser light, optical means or steel tape would be extremely difficult, time consuming or impossible. It can also be used to determine discontinuities in surfaces of known perimeter or dimension.

14 Claims, 10 Drawing Sheets

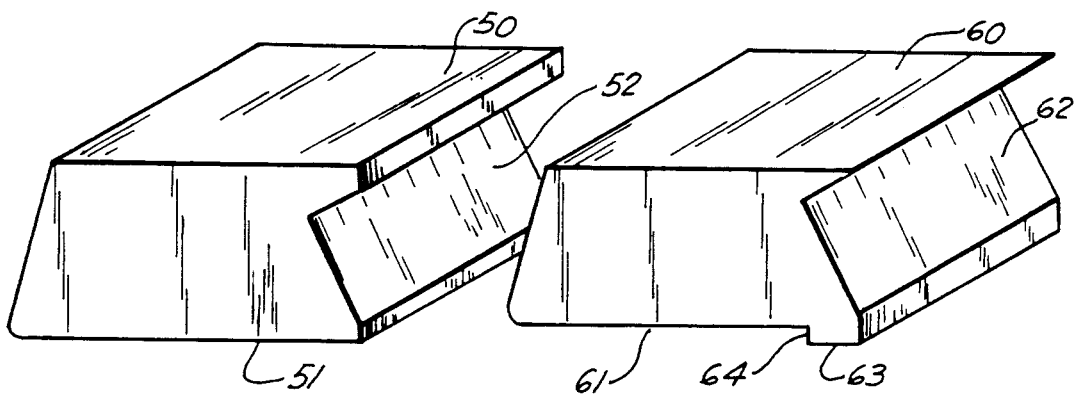
FIG. 5  FIG. 6
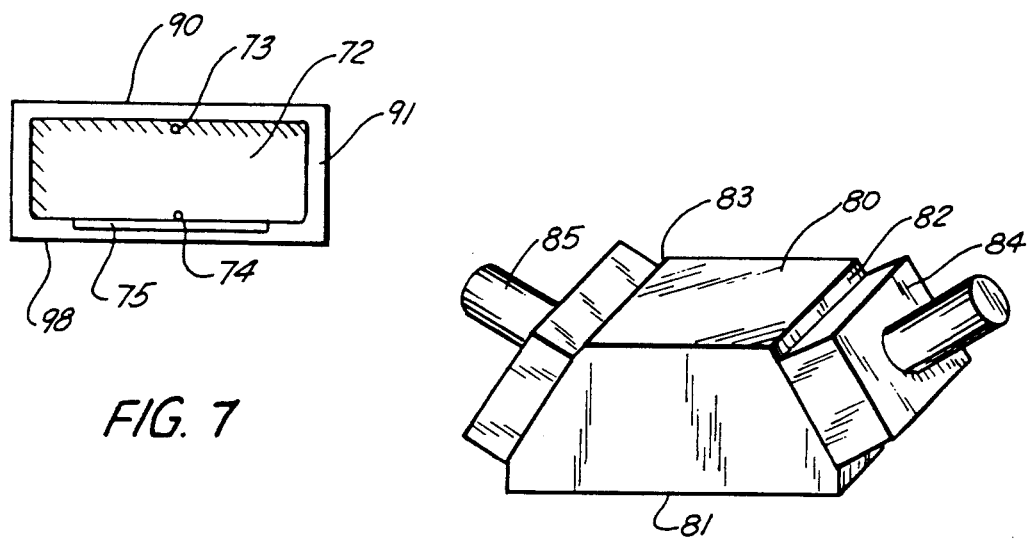
FIG. 7
FIG. 8
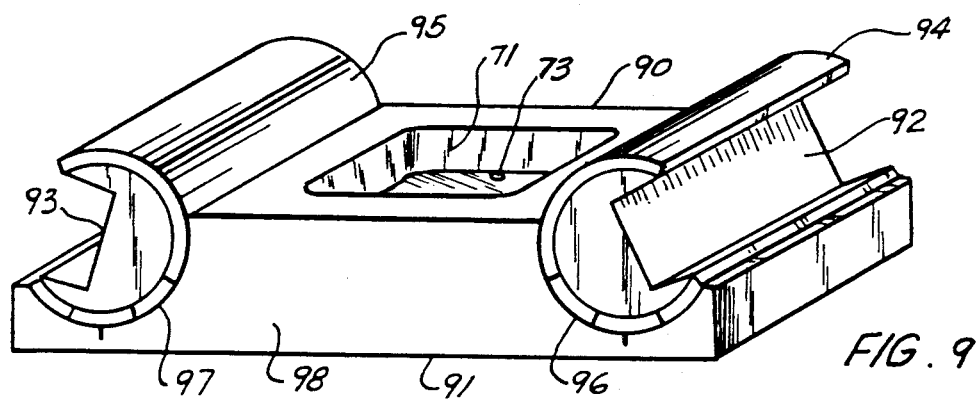
FIG. 9

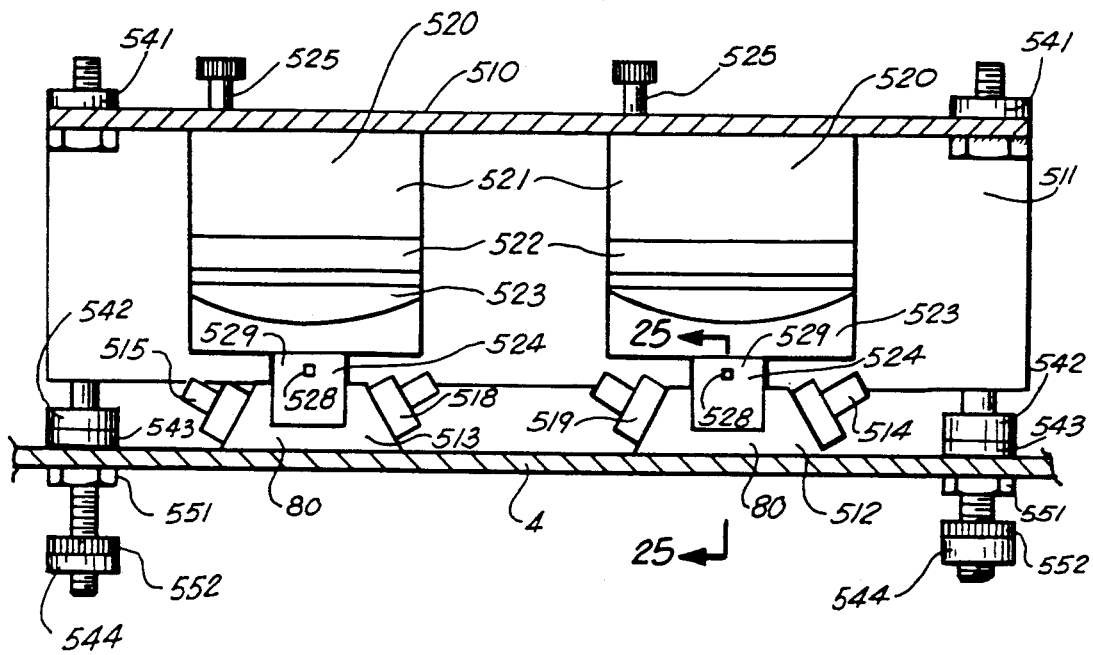
FIG. 24
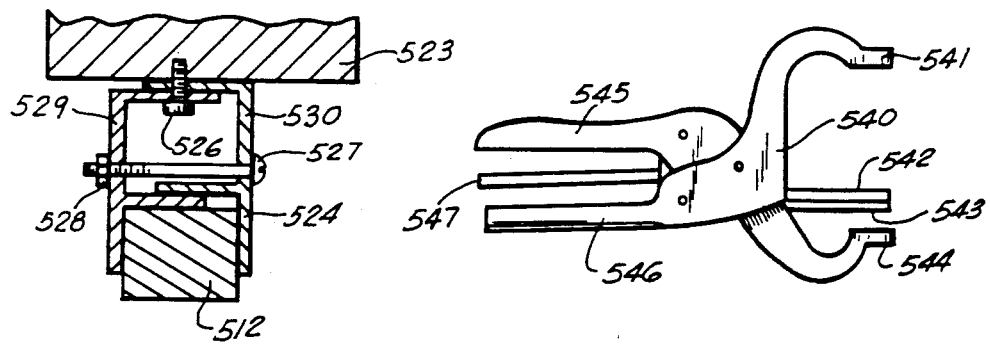
FIG. 25
FIG. 26

ULTRASONIC LINEAR MEASUREMENT SYSTEM

The invention described herein was made in the performance of work under NASA Contract No. NAS 8-33708, and is subject to the provisions of Section 305 of the National Aeronautics and Space Act of 1958, as amended (42 U.S.C. 2457). NASA signed a patent waiver (NASA Patent Waiver W-2697, NASA Case MFS-28, 266-1) for the invention on Sept. 26, 1988.

BACKGROUND OF THE INVENTION

1. Field of the Invention

The invention relates to measuring apparatus, and more particularly to length measuring apparatus.

2. General Background

The External Tank 2 (FIGS. 1 and 2) of the Space Shuttle System 1 is a very large cryogenic tank with a relatively thin wall. Tank 2 is generally made of welded aluminum (2219) and is nominally 331.000 inches in diameter (86.656 feet or 1,039.867 inches in circumference). The wall of tank 2 is nominally 0.200 inches thick (⅛% of the thickness of its diameter). If tank 2 were reduced proportionally so that its diameter were equal to that of a soft drink can, the tank 2 wall would be one half the thickness of the soft drink can wall. External Tank 2 comprises a number of cylindrical barrel sections 4 and dome structures 6 which are welded together. Because of the thinness of the wall, the perimeters of two barrel sections 4 which are to be welded together must be manufactured within close tolerance (±0.02 percent). If not, the out-of-tolerance section 4 may have to be discarded, which is a very expensive proposition.

The current method of perimeter measurement of tanks such as tank 2 involves using a steel tape. The steel tape is pulled with constant tension around the surface to be measured. Care is taken to ensure that the tape remains in the same measurement plane. The temperature is determined using a hand-held surface probe. Several measurements of the surface temperature are taken and averaged to determine the nominal temperature. The measurement is then corrected to account for the difference between the nominal temperature and some reference temperature. It normally takes approximately one hour to perform the steps necessary to obtain one measurement. Anomalies in the steel tape used for the measurement and defects in the surface to be measured can adversely affect the measurement. Since the measurement is technique-dependent, it is difficult to maintain a high degree of repeatability without significant training. Thus, using a steel tape, it is difficult to obtain a repeatable and accurate measurement of the perimeter of an External Tank section 4.

SUMMARY OF THE INVENTION

The present invention comprises a system for using ultrasonic waves to make linear measurements. The system is particularly useful for making perimeter measurements of curvilinear surfaces, but can also be used to make linear measurements of plane surfaces. Moreover, the system can be used to make linear measurements where the use of conventional measuring means would be extremely difficult or even impossible. It can measure perimeters having lengths of more than 1000 inches, as well as shorter lengths. In piecewise fashion, it may be used to measure unlimited distances. It may also be used to determine discontinuities of surfaces of known dimension.

BRIEF DESCRIPTION OF THE DRAWINGS

For a further understanding of the nature, objects, and advantages of the present invention, reference should be made to the following detailed description, taken in conjunction with the accompanying drawings, in which like reference numerals denote like elements, and wherein:

FIG. 5 is a perspective view of a wedge which is shown in use in FIG. 10.

FIG. 6 is a perspective view of a wedge which is similar to that shown in FIG. 5.

FIG. 7 is a bottom view of a wedge which is shown in FIG. 9 in accordance with the present invention.

FIG. 8 is a perspective view of another wedge in accordance with the present invention.

FIG. 9 is a perspective view of another wedge in accordance with the present invention.

FIG. 24 is a sectional view of the preferred embodiment of the sensor assembly of the present invention.

FIG. 25 is a detail thereof.

FIG. 26 is a view of a clamp used with the sensor assembly shown in FIG. 24.

DETAILED DESCRIPTION OF THE PREFERRED EMBODIMENTS

Figure 1:
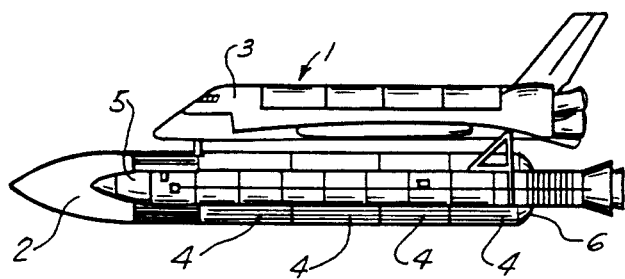
FIG. 1 is a side view of a Space Shuttle System comprised of an orbiter 3 mated to an External Tank 2 to which two solid rocket motors 5 (one shown, one opposite) are attached.
Figure 2:
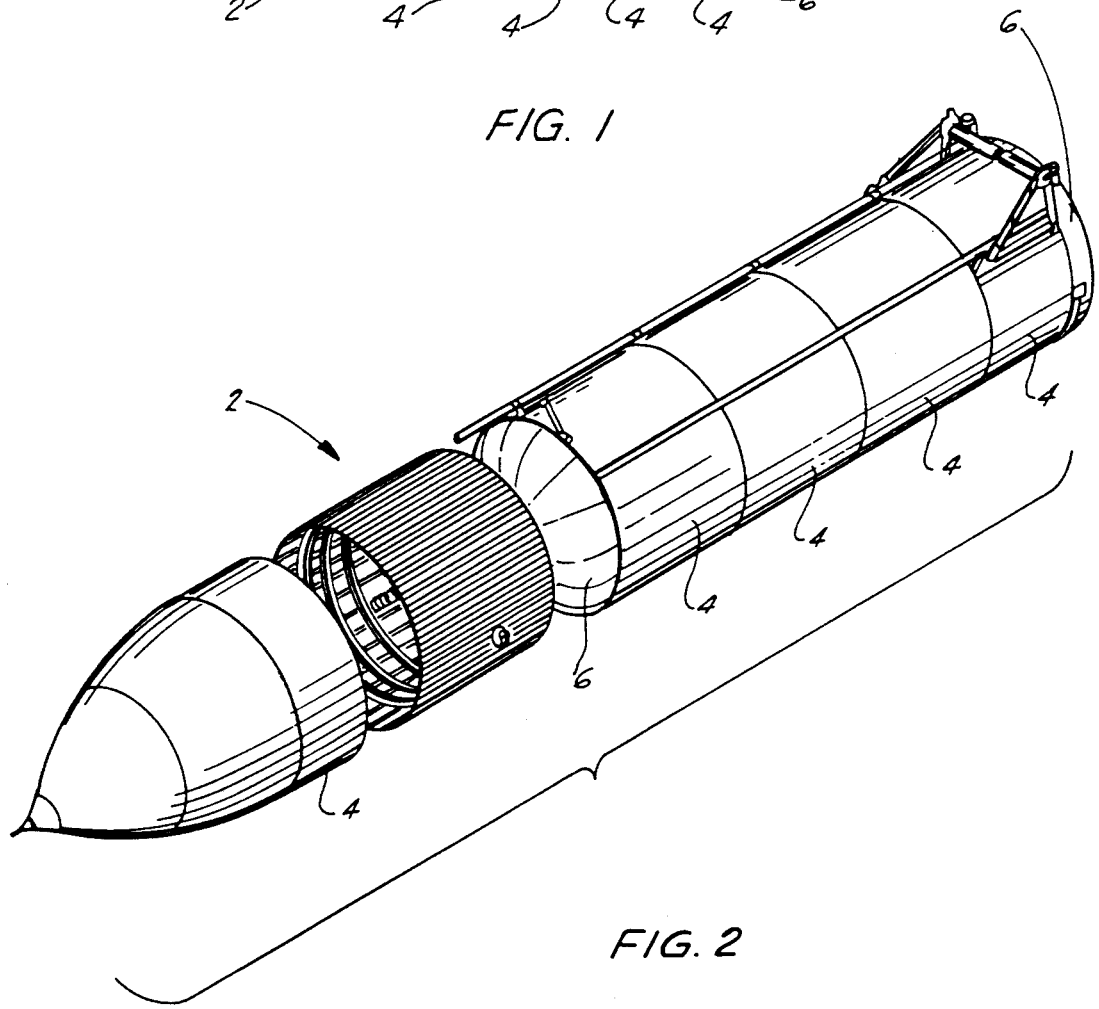
FIG. 2 is an exploded view of the external tank shown in FIG. 1.
Figure 4:
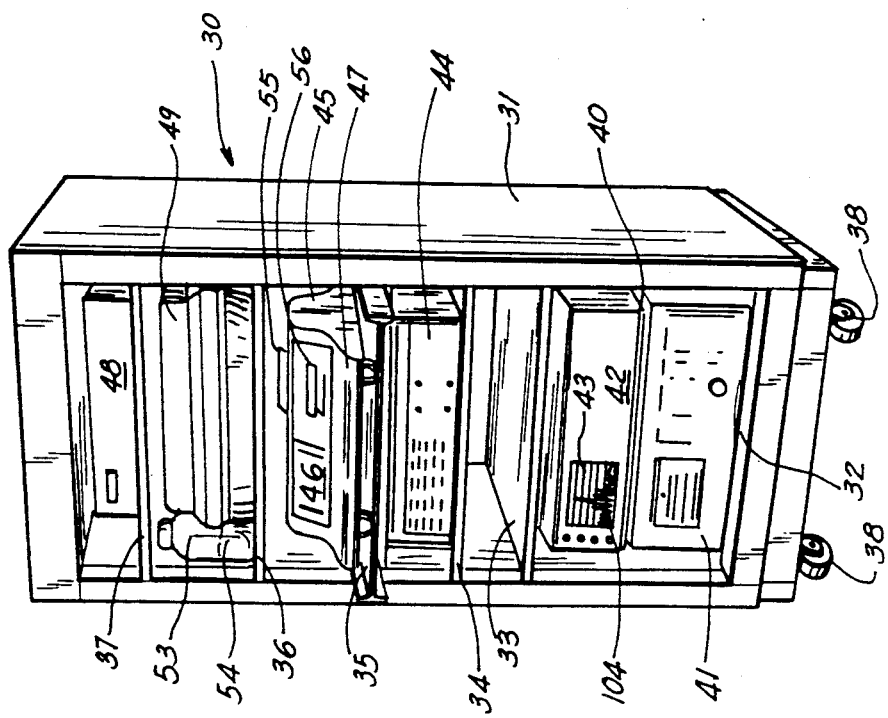
FIG. 4 is a perspective view of a cabinet housing electronic equipment in accordance with the present invention.

A preferred embodiment of the present invention is a portable ultrasonic linear measurement system comprising a portable ultrasonic sensor assembly 10 (FIG. 3), a portable temperature sensor assembly 20, and a portable data/signal processing assembly 30 (FIG. 4). Multiple systems may be used concurrently to make a multiplicity of simultaneous measurements in various dimensions.

The portable data processing assembly 30 (see FIG. 4) comprises a portable cabinet 31 having shelves 32-37 and four wheels 38 (only two of which are shown in FIG. 4) and containing all data/signal processing equipment. For example, an ultrasonic transceiver 40 sits on shelf 32. Ultrasonic transceiver 40 comprises a mainframe 41 and a display chassis 42 having a display screen 43, the purpose of which will be described below. A timer 44 sits on shelf 34. A computer 45, including data storage 56, a printer 55, a display 46 and a keyboard 47, sits on shelf 35, which slides out of cabinet 31 to make access to the computer 45 and keyboard 47 easier. A data acquisition unit 48 for temperature measurement sits on shelf 37. One or more of components 40, 44, 45, and 48 may be combined into a single, more compact device.

Figure 10:
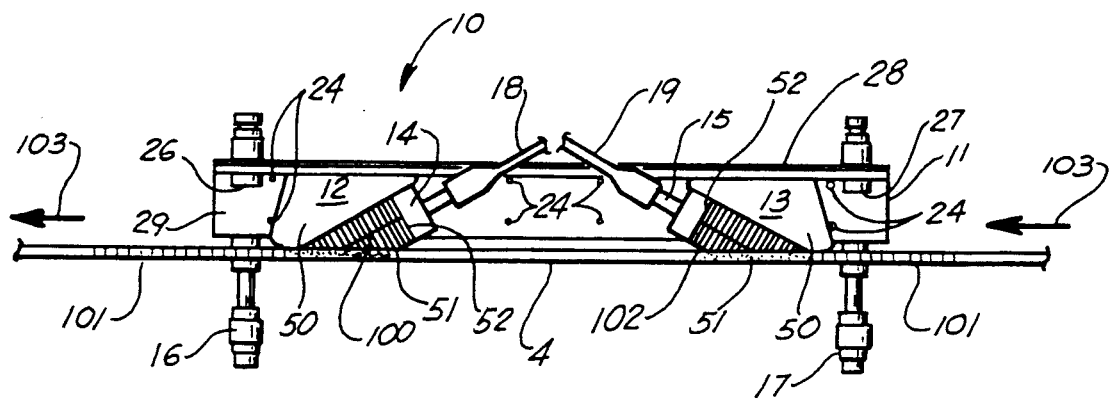
FIG. 10 is a sectional view of the system shown in FIG. 3.

Portable ultrasonic sensor assembly 10 comprises a sensor housing 11 in which ultrasonic wedges 12 and 13 (see FIG. 10) are disposed. Sensor housing 11 comprises sections (for example, two sections 28 and 29) which are individually or collectively adjustable with respect to one another. Sections 28 and 29 have holes and slots, respectively (not shown in the drawings), through which bolts 26 and 27 pass, securing housing 11 to clamps 16 and 17. Wedges may be temporarily or permanently affixed to each housing by various means (for example, adhering, clamping, screwing) and disposed at various angles relative to each other including 0°. For example, screws 25 may extend through holes in sections 29 and 28 and internally threaded spacers 24 extend between vertically aligned screws 25. Wedges 13 and 12 are placed between or affixed to sections 28 and 29 of housing 11, and threaded cylinders 24 are rotated in a direction which draws sections 28 and 29 together, clamping wedges 12 and 13 therebetween, thereby fixing the positioning of wedges 12 and 13 180° relative to one another.

Ultrasonic wedges 12 and 13 each comprise a wedge 50 (shown in more detail in FIG. 5) having a first surface 51 for acoustically contacting a subject surface area of a body to be measured and a second surface 52 for acoustically contacting an ultrasonic transducer. An ultrasonic transducer 14 acoustically contacts second surface 52 of ultrasonic wedge 12 and an ultrasonic transducer 15 acoustically contacts second surface 52 of ultrasonic wedge 13.

Surfaces 51 and 52 are relatively oriented such that ultrasonic waves emitted or received by ultrasonic transducer 14, when it is in acoustic contact with surface 52 of wedge 12, generate or detect surface waves which travel on the surface of a body when surface 51 is in acoustic contact with the surface of the body. Wedges 12 and 13 are relatively oriented such that ultrasonic waves emitted by transducer 15, when it is in acoustic contact with surface 52 of wedge 13, generate surface waves which travel on the surface of a body in a desired direction relative to (such as opposite to) that of surface waves generated by transducer 14 when it is in acoustic contact with surface 52 of wedge 12.

Clamps 16 and 17 apply pressure between housing 11 and the wall of tank section 4, clamping wedges 12 and 13 between housing 11 and the wall of tank section 4. There is preferably a coupling fluid between first surfaces 51 of wedges 12 and 13 and the wall of tank section 4 to ensure that surfaces 51 acoustically contact the wall of tank section 4. There is also preferably a coupling fluid between second surfaces 52 and ultrasonic transducers 14 and 15 to ensure that the transducers 14 and 15 and the wedges 12 and 13, respectively, remain in acoustic contact with each other. Cables 18 and 19 connect ultrasonic transducers 14 and 15, respectively, to ultrasonic transceiver 40.

Figure 3:
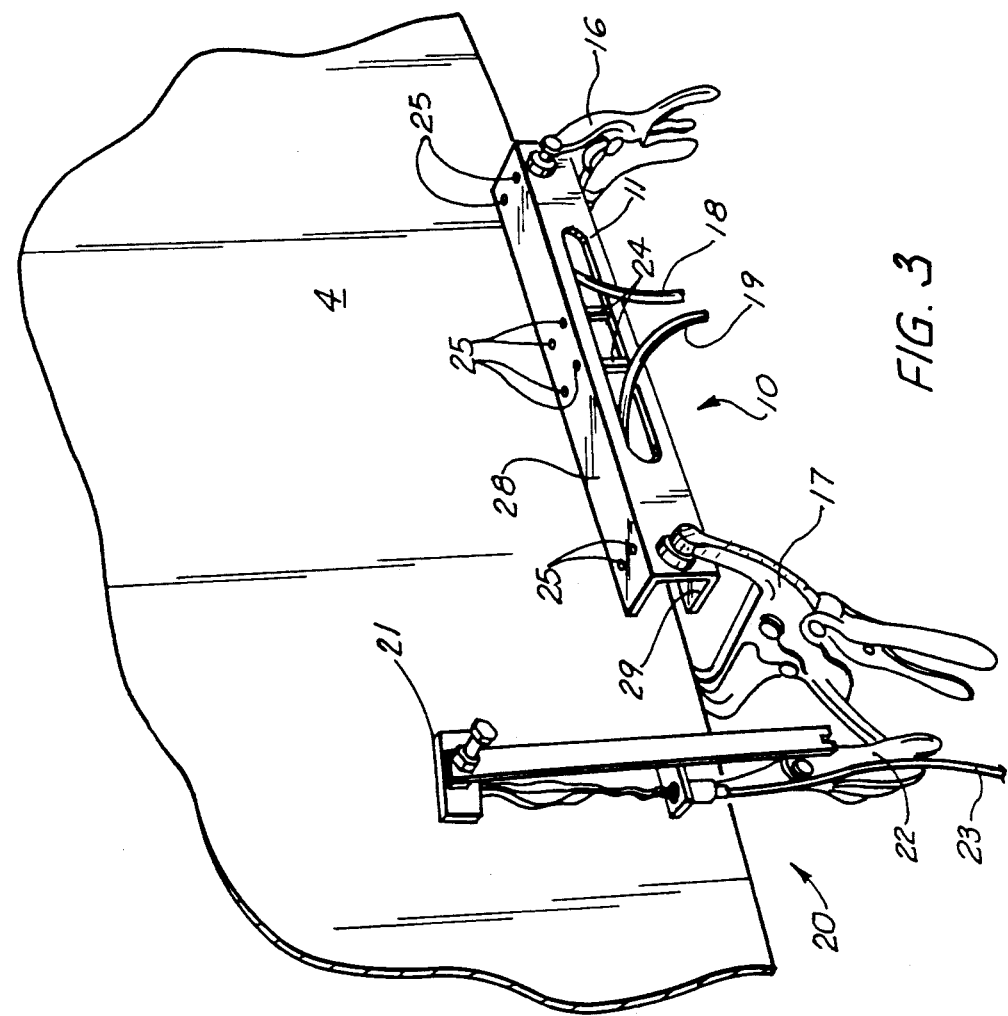
FIG. 3 is a perspective view of sensor assemblies of the present invention attached to a section of the external tank.

Portable temperature sensor assembly 20 (FIG. 3) comprises a temperature sensor 21 and a toggle clamp 22, which serves as a means for maintaining the temperature sensor in thermal contact with a structure whose temperature is to be monitored, which, in FIG. 3, is the wall of tank section 4. A cable 23 interconnects temperature sensor 21 and data acquisition unit 48. Temperature sensor 21 is preferably a responsive, sensitive, high accuracy device such as a platinum resistance temperature device (of suitable durability). There may be many such assemblies 20. Nominally there are four assemblies used for most measurements.

FIG. 6 shows an alternative embodiment of a wedge in accordance with the present invention. Wedge 60 has a first surface 61 for acoustically contacting a subject surface area of a body to be measured and a second surface 62 for acoustically contacting a transducer, such as transducer 14 or 15. Wedge 60 also has a heel 63 projecting perpendicularly outward from adjacent first surface 61. Heel 63 has a surface 64 which abuts against an end of a body whose length is to be measured. Heel 63 acts as a means for assisting in the orientation of wedge 60 relative to the surface of the body. Wedge 60 can be used to determine the length of finite length surfaces, such as semicylinders or plates. The operation of wedge 60 will be described below.

Wedge 80, shown in FIG. 8, is another embodiment of a wedge in accordance with the present invention. Wedge 80 has a first surface 81 for acoustically contacting a subject surface area of a body to be measured, second surface 82 for acoustically contacting an ultrasonic transducer 84, and a third surface 83 for acoustically contacting an ultrasonic transducer 85.

Surfaces 81 and 82 are relatively oriented such that ultrasonic waves emitted or received by ultrasonic transducer 84, when it is in acoustic contact with surface 82, generate or detect surface waves which travel on the surface of a body when surface 81 is in acoustic contact with the surface of the body. Surfaces 81 and 83 are relatively oriented such that ultrasonic waves emitted by transducer 85, when it is in acoustic contact with surface 83, generate surface waves which travel on the surface of a body in a desired direction relative to (such as opposite to) that of surface waves generated by transducer 84 when it is in acoustic contact with surface 82.

Another embodiment of a wedge in accordance with the present invention, wedge 90, is shown in FIGS. 7 and 9. Wedge 90 comprises a block 98 having a first surface 91, a recessed transmission chamber 72, a reservoir 71, a vent 75, and fluid passageways 73 and 74 providing fluid communication between reservoir 71 and recessed transmission chamber 72. Vent 75 is recessed further into block 98 than is recessed transmission chamber 72, and provides a means for allowing air bubbles to escape from recessed transmission chamber 72 through passageway 74. Reservoir 71, vent 75, and fluid passageways 73 and 74 may be recessed in any surface as may be advantageous, based on the desired orientation of block 98 with respect to gravity. A cover plate or cap for reservoir 71 may be added.

When wedge 90 is to be used on rough surfaces, rubber or other sealing means may be provided on surface 91 to maintain couplant within the area of wedge 90.

Wedges 80 or 90 may additionally comprise a heel, such as heel 63, or other means of edge reference. Recessed transmission chamber 72 may be omitted from wedge 90. Wedges 50, 60, 80, 90 may include certain characteristics as described in any of the other wedges as the application requires.

Block 98 has disposed therein recesses 96 and 97 in which are disposed cylinders 94 and 95, respectively. Cylinders 94 and 95 are capable of being indexed with respect to block 98. A second surface 92 of wedge 90 is present on cylinder 94 and a third surface 93 of wedge 90 is present on cylinder 95. Cylinder 94 and recess 96 act as a means for relatively orienting first surface 91 and second surface 92, and cylinder 95 and recess 97 act as a means for relatively orienting first surface 91 and third surface 93. Surfaces 92 and 93 may be oriented with respect to surface 91, at any angle between some minimum and maximum.

Wedges 50, 60, 80, and 90 preferably are made of acoustic grade clear acrylic plastic, a material well-known in the industry and often used for acoustic wedges.

Figure 13:
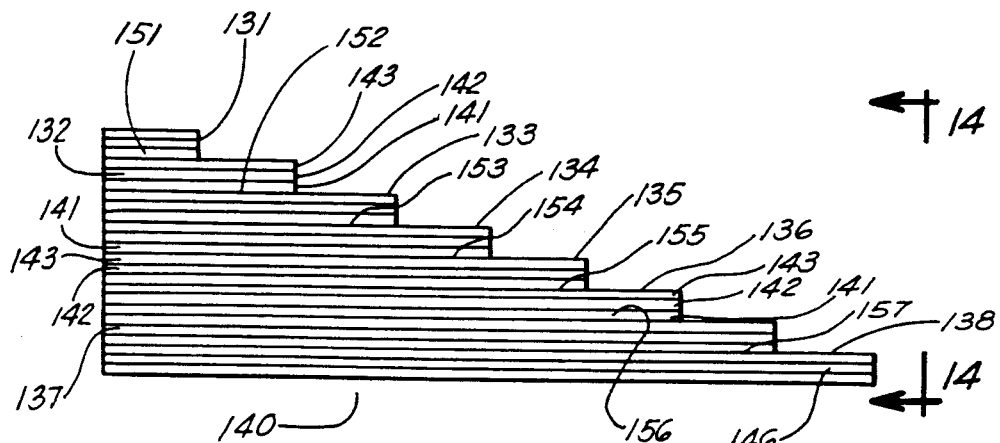
FIG. 13 is a plan view of a reference standard in accordance with the present invention.
Figure 14:
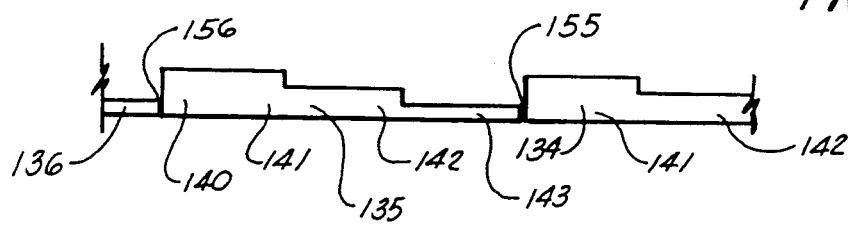
FIG. 14 is an end view taken along lines 14—14 of FIG. 13.

FIGS. 13 and 14 show a reference standard 140. Reference standard 140 comprises a number of reference lengths 131-138. Each reference length comprises three reference thicknesses 141, 142, and 143. Each reference length 131-137 also comprises an acoustic barrier (151-157) whereby a slot is cut between a reference length 131-137 and the reference length (132-138) adjacent it. Acoustic barriers 151-157 may be cut at either end of reference standard 140. It may also be cut at both ends of the reference standard as required for directionality. By way of example, reference standard 140 could have a total length of 130.000 inches (⅛ scale), each barrier 152-157 having a length of 16.250 inches, barrier 151 having a length of 8.125 inches, and each reference length differing from the previous length by 32.500 inches, each thickness 141, 142, and 143 having a width of 2.000 inches with thickness 143 having a reduced width of 1.900 inches on each length 132-138 along and beyond acoustic barriers 151-157, each thickness 141 having a height of 0.500 inches, each thickness 142 having a height of 0.320 inches, and each step 143 having a height of 0.200 inches. One could provide a reference standard whose dimensions are well known, and of relative scale to, and constructed of the same material as an object whose length or perimeter is to be measured. The velocity of acoustic waves in the material can be determined by using the measuring apparatus of the present invention to measure the amount of time it takes the acoustic waves to traverse these dimensions. The velocity thus determined can be used to determine the length or perimeter of the object to be measured.

Figure 15A:
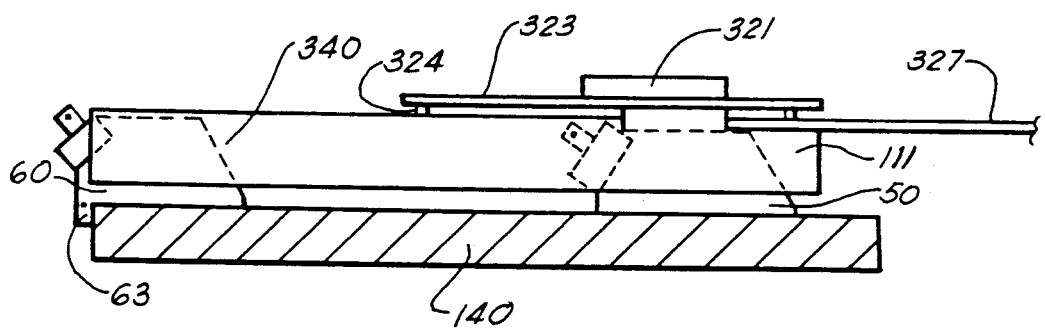
FIG. 15A is a side view of a sensor assembly in accordance with the present invention.
Figure 15B:
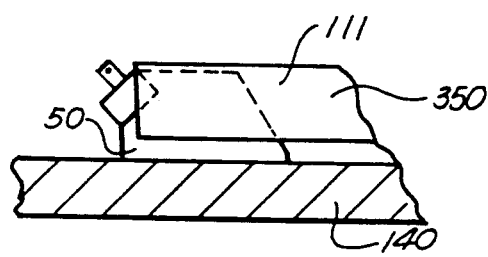
FIG. 15B is a side view of a sensor assembly in accordance with an alternative embodiment of the present invention.
Figure 15C:
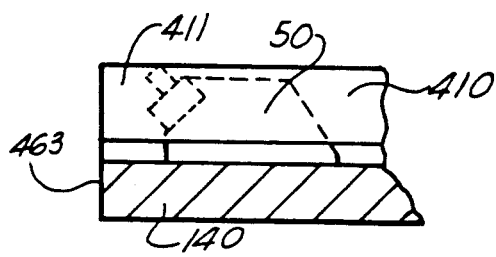
FIG. 15C is a side view of a sensor assembly in accordance with another alternative embodiment of the present invention.
Figure 15D:
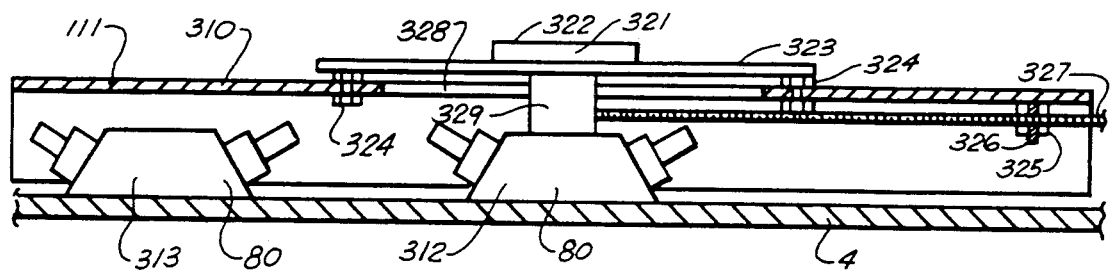
FIG. 15D is a sectional view of a sensor assembly in accordance with yet another alternative embodiment of the present invention.

FIG. 15D shows a sensor assembly 310 comprising a sensor housing 111 and two wedges 312 and 313, which comprise wedges 80. Bolts 324 affix a calibrated caliper 323 to sensor housing 111. Wedge 313 is affixedly attached to housing 111. Wedge 312 is attached to caliper head 321 by spacer 329, which extends through a slot 328 in housing 111. Caliper head 321 has a display 322 on the top thereof. Means for manual or automatic vernier adjustment of the position of wedge 312 is provided. For example, a threaded rod 327 may be threadedly disposed in a nut 325 affixedly attached to guide 326 from housing 111, and is rotatably attached to spacer 329. Movement of caliper head 321 along caliper 323 and tank section 4 may be effected by rotating rod 327. Caliper head 321 also comprises an automatic position-sensing means which detects the position of wedge 312 and displays the position on display 322. It may also send position information to computer 45. Wedges 90 could be substituted for wedges 80.

Sensor assembly 340 (FIG. 15A) is similar to sensor assembly 310, except that wedge 313 is replaced with wedge 60, and wedge 312 is replaced with wedge 50.

Sensor assembly 350 (FIG. 15B) is similar to sensor assembly 310, except that wedge 50 replaces wedge 313.

Sensor assembly 410 is similar to sensor assembly 350, and sensor housing 411 is similar to sensor housing 111. Sensor housing 411 additionally comprises a heel 463 for referencing housing 411 against the end of an object to be measured.

The preferred embodiment of the sensor assembly of the present invention, assembly 510 (FIG. 24), comprises a sensor housing 511 and wedges 512 and 513. While wedges 80 are shown as wedges 512 and 513, they could be replaced by any of the above-mentioned wedges. Sensor housing 511 is positioned on the surface of tank section 4 by gravity or mechanical means such as clamps 540 (FIG. 26) which comprise two jaws 541 and 544, a tongue 542, release mechanism 547, and handles 545 and 546. An ablative material such as polytetrafluoroethylene (PTFE) spacer 543 prevents tongue 542 from coming into contact with and damaging tank section 4. A PTFE bolt 551 and hand-adjustable nut 552 adjustably space jaw 544 from tank section 4. Jaw 541 is attached to housing 511. A positioning assembly 520 comprises means for optimizing the angle between the transducers 514, 515, 518, and 519 and tank section 4 and means for relatively orientating the axes of wedges 512 and 513, for example, the X, Z, and Z-rotation axes. There may be a Z-translation stage 521, an X-translation stage 522, a goniometer 523 and a wedge attachment means 524 attached to each of wedges 512 and 513. Wedge attachment means 524 (FIG. 25) comprises two brackets 529 and 530 joined by a screw 527 and a nut 528 which adjust their lateral displacement. A screw 526 secures brackets 529 and 530 to the base of goniometer 523. Hand-adjustable screws 525 (some not shown) rotate/translate positioning assembly 520 in housing 511.

When the ultrasonic linear measurement system of the present invention is not in use, ultrasonic transducers 14 and 15 and wedges 50, 60, 80, and 90 may be stored in a transducer case 49 on shelf 36 of portable cabinet 31, and the remainder of ultrasonic sensor assemblies 10, 310, 340, 350, 410, 510, temperature assembly 20, and cables 18, 19, and 23 may be stored on shelf 33. A bottle 53 containing acoustic coupling fluid 54 may be stored in cabinet 31 on shelf 36. Thus, all components of the ultrasonic linear measurement system of the present invention can be contained in cabinet 31, which can be transported to the site where it is needed.

In operation, when it is desired to measure the perimeter of tank section 4, one wheels cabinet 31 to the location of tank section 4. One places ultrasonic assembly 10 in acoustic contact with the wall of tank section 4, as shown in FIG. 3. Temperature assemblies 20 (usually four) are placed in thermal contact with the wall of tank section 4.

When tank section 4 comprises 2219-T87 aluminum, wedges 50 preferably are approximately 2.070 inches long, 1.475 inches high, with an angle of 63.40° between surfaces 51 and 52, and may comprise part No. 57K0878 made by Stavely NDT Technologies; tranducers 14 and 15 are preferably 1 MHz transducers, such as part No. 57A8311 made by Stavely NDT Technologies; optimum acoustic coupling can be achieved by using demineralized water between wedges 50 and tank section 4, and heavy viscosity ultrasonic couplant between wedges 50 and transducers 14 and 15.

Figures 11, 12:
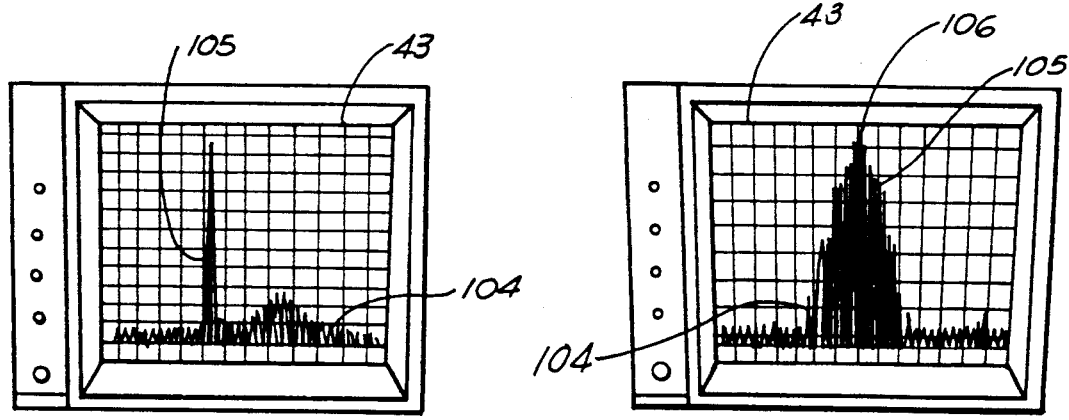
FIG. 11 shows a return waveform produced by the apparatus of the present invention.
FIG. 12 shows the waveform of FIG. 11 displayed over a shorter time interval.
Figure 16:
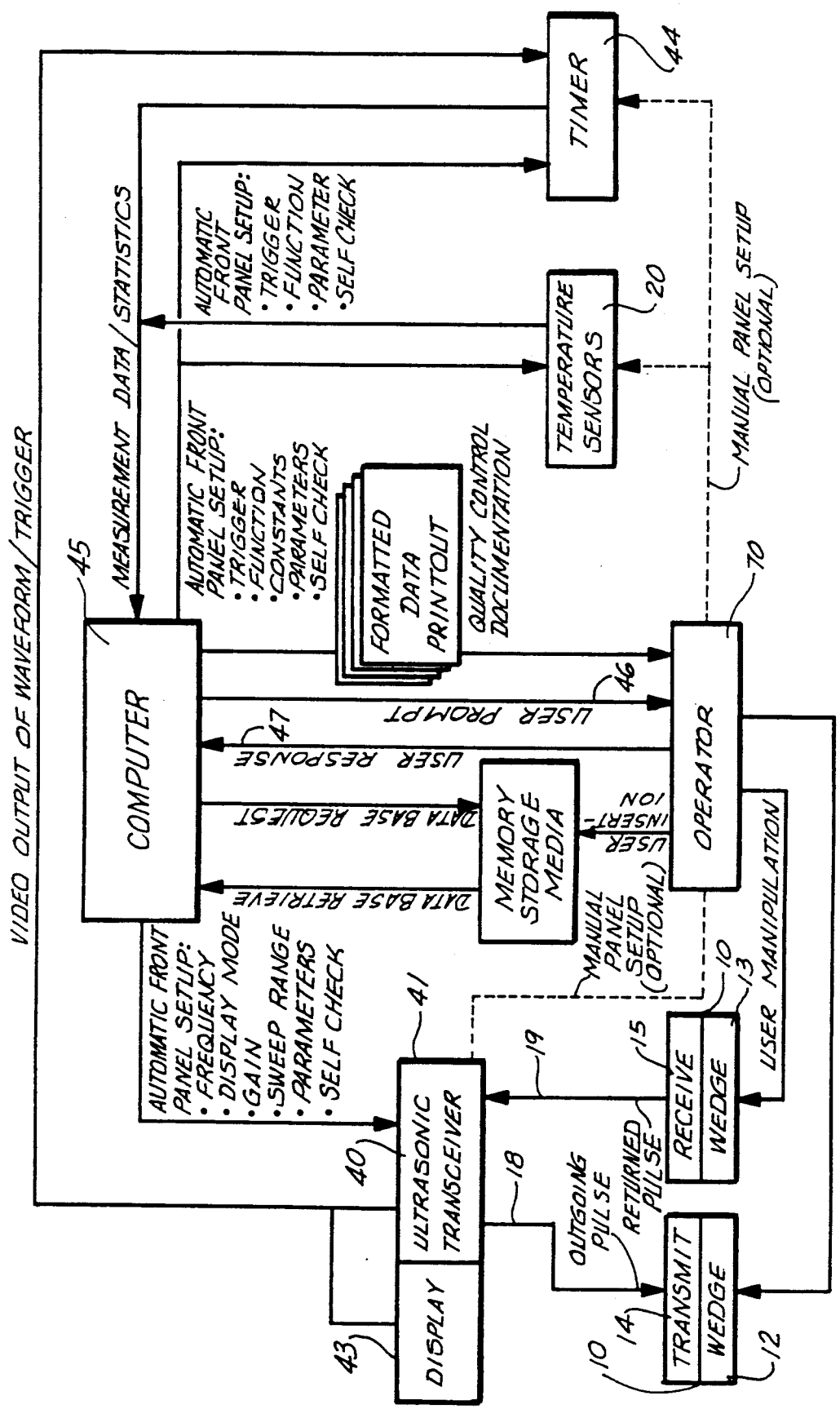
FIG. 16 is a schematic diagram showing the interconnection of various components of the system of the present invention.

Once assemblies 10 and 20 are placed in acoustic contact with the wall of tank section 4, an operator 70 (see FIG. 16) informs computer 45, via keyboard 47, to begin operations. The computer communicates with timer 44, data acquisition unit 48, and transceiver 40 to perform diagnostic testing of each individual unit and the entire system for proper operation. Computer 45 then communicates with each unit to load the proper front panel settings for the particular part number or test article under test. The sensors 20, 10, are then tested for proper operation. The average temperature is determined and printed. Computer 45 communicates with mainframe 41 of ultrasonic transceiver 40. Mainframe 41 causes ultrasonic transducer 14 to generate ultrasonic acoustic waves 100 (see FIG. 10) in wedge 12 and initiates timer 44 measurement through display output 43. Waves 100 may be either longitudinal or transverse. The relative orientation of first surface 51 and second surface 52 of wedge 50 is such that the ultrasonic waves 100 produce ultrasonic surface acoustic waves 101 on the surface of tank section 4 (as used herein, "surface acoustic waves" or "surface waves" shall be understood to describe both the theoretical Rayleigh surface wave and the practical Lamb waves associated with thin plates). Surface waves 101 travel on the surface of the wall of tank section 4 in the direction of arrows 103 (see FIGS. 10 and 18). When waves 101 reach wedge 13, they generate ultrasonic acoustic waves 102 in wedge 13. Ultrasonic waves 102 are detected by mainframe 41 through transducer 15. The relative strength of returning ultrasonic wave 102 is detected by transducer 15. It is conditioned and amplified by mainframe 41 and is displayed as waveform 104 on display 43 in the form of voltage (vertical) as a function of time (horizontal). Waveform 104, and specifically peak 106 (FIG. 12) of spike 105 (FIGS. 11 and 12) is used by timer 44 to determine the time of propagation of waves 100, 101, and 102 from transducer 14 to transducer 15.

Transducer 14 transmits a plurality of waves 100, adjacent waves 100 being spaced far enough apart in time such that a wave 102 corresponding to a first wave 100 generated by transducer 14 is detected by transducer 15 before the next wave 100 is transmitted by transducer 14.

The measurement program in computer 45 determines the constant for the speed of ultrasonic surface waves for the type of material making up tank section 4. It obtains a number of individual temperatures from data acquisition unit 48 (which received the temperatures from sensor 21 via cable 23) and calculates their average. It sets the correct signal level such that wave form 104 will be detectable by timer 44, based on the characteristics of the tank section 4 (approximate length and type of material) and the average temperature. It obtains a multiplicity of samples, for example one hundred, each sample consisting of the measured time interval between generation of wave 100 by ultrasonic transducer 14 and the receipt of wave 102 by ultrasonic transducer 15. It deletes out of range samples, and adjusts the measurement for temperature, shift and trigger point, distance between transducers 14 and 15 and other offsets and corrections. It then plots average temperature and average length, then it prints the time, signal strength, length, temperature, standard deviation, and number of samples used.

Detailed information about the software used in the present invention, including a copy of a program, can be found in Appendix A attached hereto. Detailed information about the hardware can be found in Appendix B.

Figure 18:
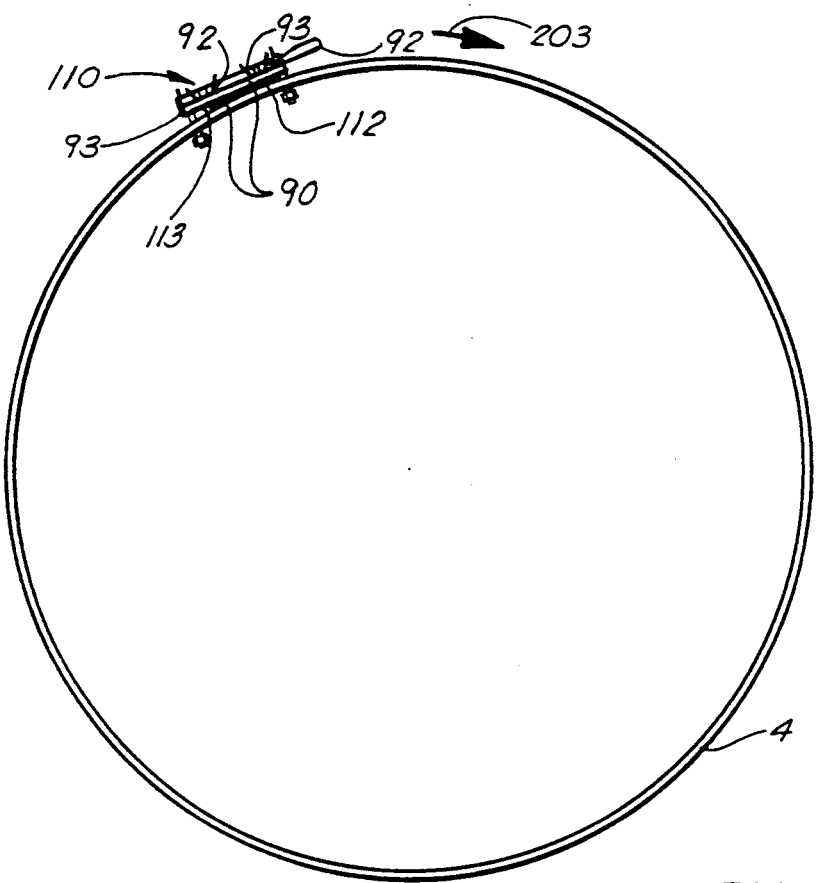
FIG. 18 is a view similar to FIG. 17 showing the system of an alternative embodiment of the present invention in use.
Figure 17:
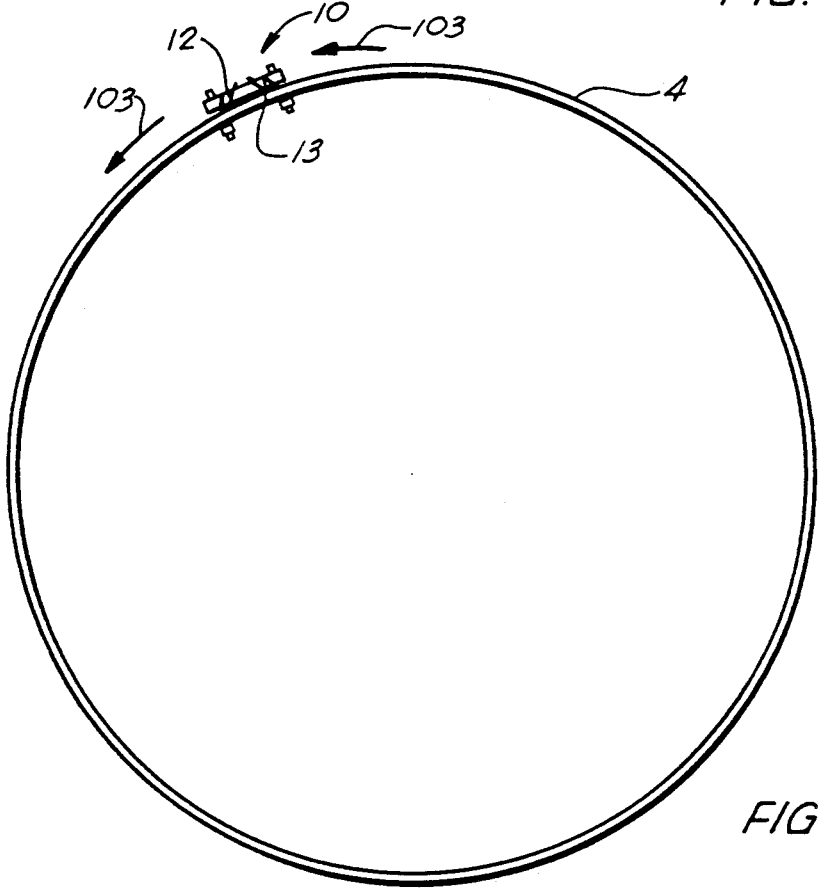
FIG. 17 shows the system of the present invention being used to measure the perimeter of an External Tank section.
Figure 19:
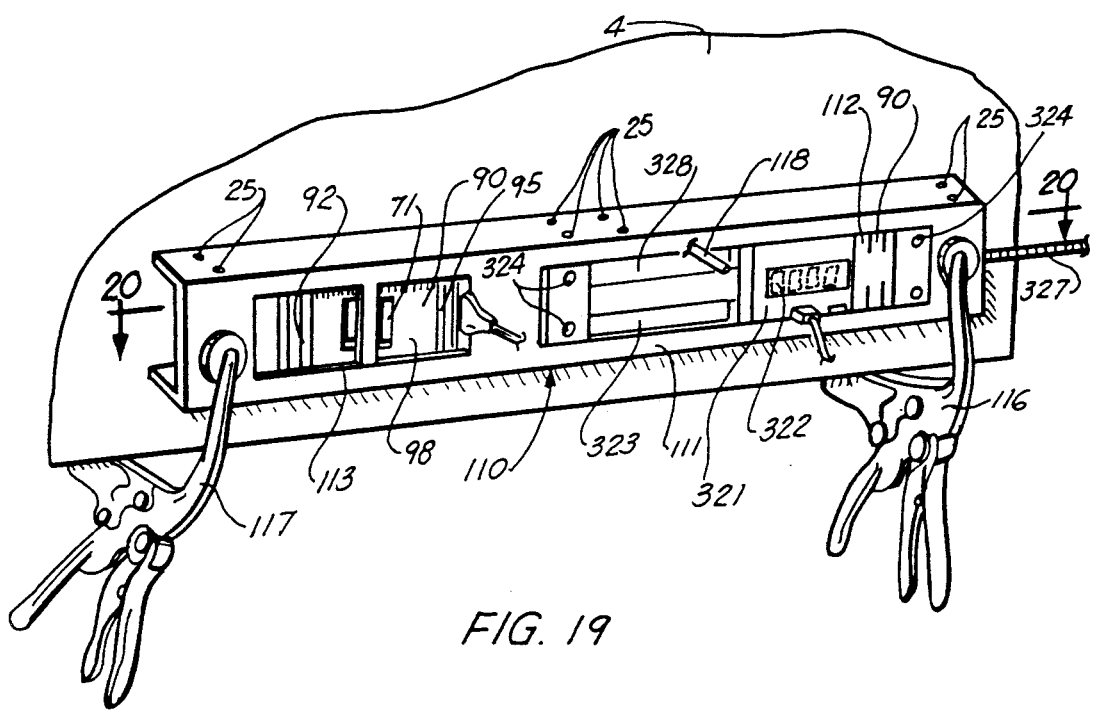
FIG. 19 is a perspective view of the sensor assembly shown in FIG. 18.
Figure 20:
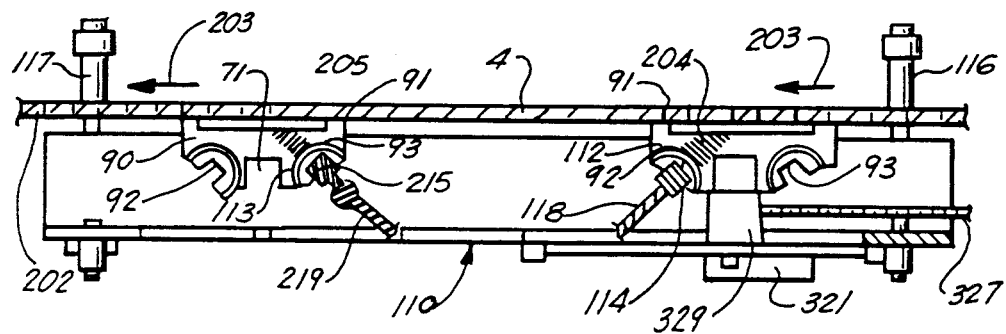
FIG. 20 is a cut-away view taken along lines 20—20 of FIG. 19.

FIGS. 18, 19, and 20 show a portable ultrasonic sensor assembly 110 which is similar to, and can be used instead of, portable ultrasonic sensor assembly 10. It can be used to determine the propagational velocity of, and to measure the perimeter of, a curvilinear body, such as tank section 4. Portable ultrasonic sensor assembly 110 is advantageous in that only the relative offsets of the wedges used need be known. Additionally, the velocity of surface waves on the surface of tank section 4 can be determined at the same time that the distance is being measured, as will become apparent shortly.

Transducers 114 and 215 (not shown in FIG. 18) are placed in acoustic contact with surfaces 92 and 93 of wedges 112 and 113 (each of which comprises a wedge 90 as shown in FIGS. 7 and 9), respectively. Wedges 112 and 113, which could alternatively comprise wedges 50, 60, or 80, are placed a predetermined distance apart. Wedge 113 is clamped to sensor housing 111 in the same manner that wedges 12 and 13 are clamped to sensor housing 11 and wedge 112 is attached to caliper head 321 through spacer 329. Wedges 112 and 113 and housing 111 are placed in acoustic contact with tank section 4 with clamps 116 and 117 with first surfaces 91 of wedges 112 and 113 in acoustic contact with the surface of tank section 4. Acoustic coupling fluid (preferably demineralized water) is used to acoustically couple surfaces 91 with the surface of tank section 4. The coupling fluid is preferably poured into reservoir 71 after wedges 112 and 113 are clamped to tank section 4. Surfaces 92 and 93 of wedge 112 are oriented relative to surface 91 of wedge 112 such that the signal strength of the ultrasonic waves is maximized. This can be done by trial and error by starting with surfaces 92 and 93 near the theoretically determined optimum angle with respect to surface 91 and varying the relative angles of surfaces 92 and 93 until the signal strength is at a maximum. This normally takes only a few moments. The same optimization technique is then performed using wedge 113. Optimization takes place by alternating between wedges 112 and 113 until no further optimization is necessary. The positions of wedges 112 and 113 are then locked to prohibit inadvertent movement during measurements. Offsets are entered into the computer.

Once the proper angle between surface 91 and each of surfaces 92 and 93 has been determined and locked in place, measurement of the perimeter of tank section 4 begins. An ultrasonic wave 205 is generated by ultrasonic transducer 215, which is in acoustic contact with third surface 93 of wedge 113. This ultrasonic wave travels through wedge 113 and generates a surface wave 202 on the surface of tank section 4. Surface wave 202 travels in the direction of arrow 203 to wedge 112, where it generates an ultrasonic wave 204 which travels through wedge 112 and is detected at surface 92 of wedge 112 by ultrasonic transducer 114, which is in acoustic contact therewith. Wedge 112 is then moved an incremental distance from wedge 113 by rotating rod 327 and the previous steps are repeated. This process takes place a multiplicity of times until the differential velocity measurements converge statistically within the required measurement tolerance. All the data is then statistically analyzed and corrected for relative lateral and angular position of the wedges. The velocity of surface waves on the surface of tank section 4 is calculated by statistically analyzing the incremental time intervals between transmission of the ultrasonic waves 205 in wedge 113 by transducer 215 and detection of the ultrasonic waves 204 in wedge 112 by ultrasonic transducer 114, and dividing the known, predetermined and incremental distances by that time interval.

The perimeter of tank section 4 is determined by measuring the time interval between transmission of the ultrasonic waves 205 in wedge 113 by transducer 215, and reception of wave 204 by transducer 114 in wedge 112, and multiplying that time interval by the experimentally determined velocity and correcting for certain other constants (such as distance between wedges 112 and 113).

Figure 22:
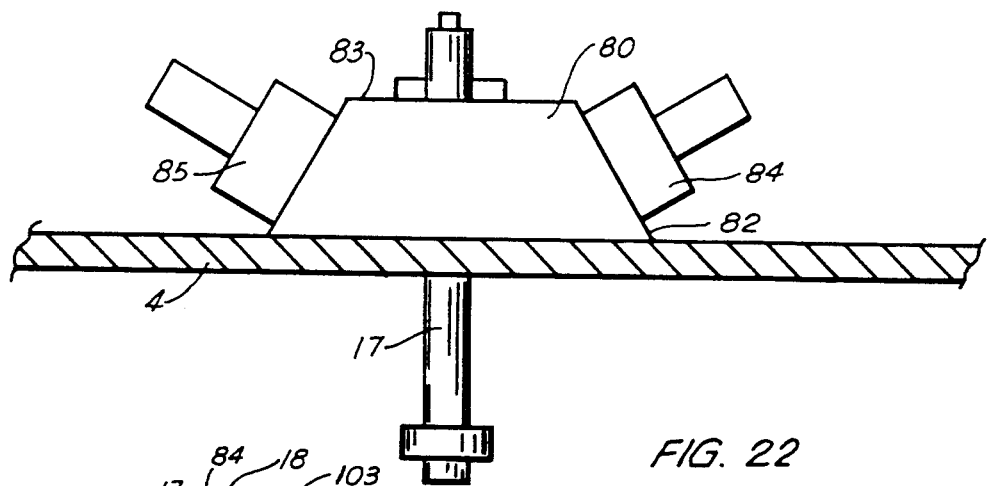
FIG. 22 is a side view of another embodiment of the sensor assembly of the present invention.
Figure 23:
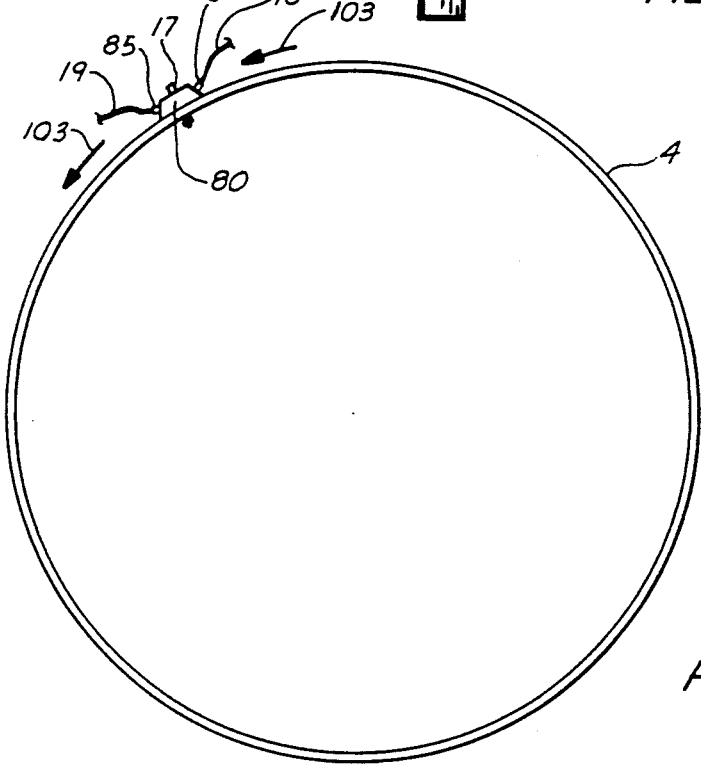
FIG. 23 is a an end view showing the sensor assembly of FIG. 22 in use.

One could use a wedge 80 (FIG. 8) or 90 (FIG. 9) without a sensor housing. For example, one could attach cables 18 and 19 to ultrasonic transducers 84 and 85 (see FIGS. 22 and 23), respectively. A single wedge 80 would act as the transmitting and receiving wedge, the ultrasonic wave being generated at surface 82 and detected at surface 83. The wedge 80 could be placed in acoustic contact with a surface (such as tank section 4) whose perimeter is to be measured with one's hand or other mechanical means (such as clamp 17). The operation otherwise would be similar to the system using wedges 12 and 13.

Figure 21:
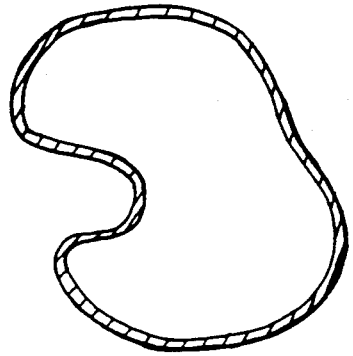
FIG. 21 is an end view of a curvilinear object whose perimeter can be measured with the system of the present invention.

A three-dimensional curvilinear body 210 is shown in end view in FIG. 21. One can readily see how difficult it would be to measure the perimeter of body 210 with a steel tape. Using the system of the present invention, the perimeter of body 210 can be measured as easily as that of tank section 4.

In view of the numerous modifications which could be made to the preferred embodiments disclosed herein without departing from the scope or spirit of the present invention, the details herein are to be interpreted as illustrative and not in a limiting sense.

APPENDIX A

A.1 SOFTWARE OVERVIEW

A.2 SOFTWARE DESCRIPTIONS

A.3 SOFTWARE LISTINGS 1.0   Software Overview

There are four main programs that are executed by the main computer: 'Autost', 'DGNOS2', 'FPSMOD', and 'TCC704'. The programs included here are subject to change without notice and are intended to generally convey the measurement process structure rather than focus on the specific commands. The software was written in a Hewlett Packard version of the BASIC programming language (HP Basic) for use on an 85B personal computer that has advanced programming and I/O ROMs installed. The complete program listing follows this more general description.

1.1 Autost

Designated as 'Autost', this program is automatically started (<u>Auto</u>matically <u>st</u>arted) on power-up. It initiates execution of the rest of the programs and sets the system time and date.

1.2 DGNOS2

Designated 'DGNOS2', the program indicates the second major revision of the program designed to perform the system diagnostics (<u>D</u>ia<u>GNOS</u>tics <u>II</u>). Included in the software are the communications, calibration, command string and operation verification checks.

1.3 FPSMOD

Designated 'FPSMOD', the program was designed to handle data base inquiries, modifications, deletions, and additions, generally described as front panel setup modifications (<u>F</u>ront <u>P</u>anel <u>S</u>etup <u>MOD</u>ifications).

1.4 TCC704A

Designated 'TCC704', the program was designed to perform the measurement and remotely control the individual pieces of equipment involved in the measurement process. It includes a timer correction constant introduced in the 1987 major revision 04 (<u>T</u>imer <u>C</u>orrection <u>C</u>onstant - 198<u>7</u> major revision <u>04</u>).

2.0 Software Description

The following is a general description of the individual subroutines and main drivers that form each program. The line numbers refer to the line on which the subroutine begins. They are also indicated in the program printout by the hand marked lines.

2.1 Autost

2.1.1 Main driver

| Line # | Description |
|---|---|
| 10 | Designation |
| 20 | Configuration: month-day-year-time |
| 30 | Initializations |
| 120 | System time clock and date |
| 190 | transfer of control to DGNOS2 |

2.1.2 Subroutines

None

2.2 DGNOS2

2.2.1 Main driver

| Line # | Description |
|--------|-------------|
| 10 | Designation |
| 20 | Configuration: month-day-year-time |
| 30 | Address definitions |
| 130 | Array definitions |
| 133 | Initializations |
| 240 | Check communications port |
| 390 | Check data acquisition equipment (temperature sensors) |
| 580 | Check timer equipment |
| 750 | Check ultrasonic transceiver |
| 860 | Transfer of control to TCC704 |
| 970 | Error Messages & transfer of control |

2.2.2 Subroutines

2.2.2.1 Parallel interface (HPIB)

| Line # | Description |
|--------|-------------|
| 1100 | Switching and Handshaking test |
| 1370 | Status bit test |
| 1490 | Error messages & transfer of control |

2.2.2.2 Data Acquisition Equipment (HP 3421A)

| Line # | Description |
|--------|-------------|
| 1600 | Initialization test |
| 1800 | Configuration test |
| 1920 | RAM-ROM-A/D test |
| 1980 | Relay test |
| 2160 | Reference junction test |
| 2190 | General setup test |
| 2350 | Status word acquisition |
| 2411 | Status word printing |

2.2.2.3 Timer Equipment (HP 5335A)

| Line # | Description |
|--------|-------------|
| 2420 | Serial Poll status check |
| 2550 | Initialization |
| 2710 | Self Diagnostics |

2.2.2.4 Ultrasonic Equipment (QC 2000)

| Line # | Description |
|--------|-------------|
| 3890 | Configuration check |
| 4140 | Error messages and transfer of control |
| 4180 | Print status bytes |
| 4610 | Automatic Gain Control |
| 4860 | Initial display setup (5000 ms window) |
| 4950 | Measurement display setup (50 ms window) |
| 5040 | Bit masks for gain control |
| 5200 | Check for signal level |
| 5380 | Error message and transfer of control |

| Line # | Description |
|---|---|
| 5430 | Store new setup |
| 5530 | Program module |
| 5600 | Store in memory block 1 |
| 5660 | Recall current setup |
| 5710 | Recall setting in memory block 1 |
| 5790 | Lock out front panel controls |
| 5840 | Set sweep length |
| 5970 | Set blocking delay to center signal in display (50 ms window) |
| 6060 | Set divisor for echo or thru beam modes |
| 6110 | Get 100 time samples |
| 6300 | Check for samples within set tolerances |
| 6410 | Sort measurements and delete ones out of tolerance |

2.2.2.5    General use

| Line # | Description |
|---|---|
| 4260 | Part number data entry format |
| 4420 | Part number check and search |
| 4530 | HPIB Reset |

2.3 FPSMOD

2.3.1 Main driver

| Line # | Description |
|---|---|
| 10 | Designation |
| 20 | Configuration: month-day-year-time |
| 30 | Initializations |
| 110 | String array definitions |
| 301 | Array definitions |
| 308 | Integer definitions |
| 322 | Real number definitions |
| 410 | Initializations |
| 510 | Main Menu |
| 640 | Change Menu |
| 760 | Add Menu |
| 880 | Print Menu |
| 1000 | Program completion and transfer of control |
| 1070 | Error messages and transfer of control |

2.3.2 Subroutines 2.3.2.1    General use

| Line # | Description |
|---|---|
| 1100 | Part number formatting |
| 1210 | Part number check and search |
| 1310 | Part number delete |
| 1440 | Part number add |
| 1680 | Part number print |
| 1780 | Sensor combination change |
| 1840 | Sensor combination add |
| 1980 | Sensor combination print |
| 2160 | Timer configuration change |
| 2370 | Timer status check |
| 2460 | Timer configuration store |

| | |
|---|---|
| 2670 | Timer status print |
| 2900 | Data Acquisition status check |
| 3050 | Data Acquisition status print |
| 3210 | Data Acquisition add |
| 3460 | Data Acquisition configuration store |
| 3700 | Timer configuration decode |
| 3880 | Ultrasonic configuration change |
| 4160 | Ultrasonic status byte print |
| 4270 | Ultrasonic program byte print |
| 4390 | System configuration data storage (on tape) |
| 4480 | Automatic Gain Control |
| 4730 | Initial display setup (5000 ms window) |
| 4820 | Measurement display setup (50 ms window) |
| 4910 | Bit masks for gain control |
| 5070 | Check for signal level |
| 5250 | Error message and transfer of control |
| 5300 | Store new setup |
| 5400 | Program module |
| 5470 | Store in memory block 1 |
| 5530 | Recall current setup |
| 5580 | Recall setting in memory block 1 |
| 5660 | Lock out front panel controls |
| 5710 | Unlock front panel controls |
| 5760 | Set sweep length |
| 5810 | Set blocking delay to center signal in display (50 ms window) |

2.4 TCC704

2.4.1 Main driver

| Line # | Description |
|---|---|
| 10 | Designation |
| 20 | Configuration: month-day-year-time |
| 30 | Initializations |
| 90 | String array definitions |
| 310 | Array definitions |
| 550 | Integer definitions |
| 570 | Real number definitions |
| 1160 | Initializations (see also 7560) |
| 1590 | Load system configuration |
| 1710 | Measure length |

2.4.2 Subroutines

2.4.2.1 General use

| Line # | Description |
|---|---|
| 1790 | System operation verification and sensor checks |
| 2000 | Perform measurement |
| 2240 | Timer configuration load |
| 2340 | Error messages and transfer of control |
| 2380 | Data Acquisition configuration load |
| 2470 | Error messages and transfer of control |
| 2520 | Ultrasonic configuration load |
| 2750 | Error messages and transfer of control |

| | |
|---|---|
| 2790 | Ultrasonic program byte print |
| 2870 | Part number formatting |
| 3000 | Part number check and search |
| 3170 | Measurement statistics print |
| 3430 | Measurement session termination verification |
| 3520 | Graphics print: screen, seconds/inches histogram |
| 3720 | Close files and terminate program |
| 3780 | Time and measurement data set print |
| 3860 | Reset HPIB |
| 3940 | Determination of graph vertical/horizontal position |
| 4000 | Graph print and clear, point reset |
| 4110 | Graph vertical shift |
| 4170 | Temperature (RTD) conversion to centigrade |
| 4320 | Temperature conversion - centigrade to Fahrenheit |
| 4360 | Individual RTD conversion - resistance to Fahrenheit |

3.0 SOFTWARE LISTING

```
LOAD "Autost"
   29617 -> USES 430 BYTES
LOAD "DGNOS2"
   11518 -> USES 18,529 BYTES
LOAD "FPSMOD"
   12594 -> USES 17,453 BYTES
LOAD "TCC704"
    2556 -> USES 27,491 BYTES

EMPTY = 30047

CAT 12/23/88
NAME      TYPE    BYTES   RECS   FILE
P/NDAT    DATA    32      32     1
FPSDAT    DATA    256     32     2
Autost    PROG    256     3      3
DGNOS2    PROG    256     73     4
TCC704    PROG    256     108    5
          NULL    256     66     6
          NULL    256     67     8
          PROG    256     69     9
```

```
 10 !          Autost
 20 ! 0618870615    0110360940
 30 CLEAR
 40 ! ENABLE KBD BTD("00000001")
 50 INTEGER D
 60 REAL T
 70 T=0
 80 D=0
 90 DISP "ULTRASONIC LINEAR MEASUREMENT";"SYSTEM"
100 BEEP 50,300
110 WAIT 3000
120 ! SET SYSTEM TIME CLOCK
130 DISP "TIME   (HH:MM:SS)" @ BEEP 90,100 @ INPUT R$
140 T=HMS(R$)
150 SETTIME T,D
160 DISP "DATE   (MM/DD/YYYY)" @ BEEP 140,100 @ INPUT R$
170 D=MDY(R$)-2400000
180 SETTIME TIME,D
190 CHAIN "DGNOS2"
END
```

```
 10 !          DGNOS2
 20 ! 0104881035    0522371005
 30 CLEAR
 40 ! ENABLE KBD BTD("00000000")
 60 ! SELECT CODES USED
 70 !    9  = HPIB INTFCE SEL CDE
 80 !    XX = DEVICE SEL CODE
 90 !    901= 3421A DATALOGGER
100 !    902= SAVE FOR 3421 LOGR
110 !    903= 5335 UNIV TIMER
120 !    904= QC2000 PULSE/RECVR
130 DIM B1(26),G1(26),M0(101)
131 DIM C0$[30],M$[2108],M1$[218],S1$[264],S3$[264],S4$[264]
133 M6= 009
134 ! C0$=" ..."
135 C0$=" ..."
140 DISP "DIAGNOSTIC ROUTINE"
160 WAIT 3000
190 DIM A$[30],S1(24)
210 SET TIMEOUT 9;5000
220 ON TIMEOUT 9 GOTO 970
240 ! CHECKING HPIB (FROM P. 75, HPIB MANUAL 82937-90017)
250 DISP "CHECKING HPIB"
270 GOSUB 4530 ! RESET HPIB
310 GOSUB 1110 ! SW & HDSHK
320 GOSUB 1360 ! STATUS TEST
330 DISP "HPIB TEST COMPLETE"
390 ! CHECKING 3421A DATALOGGER
400 DISP "CHECKING 3421A"
410 ON TIMEOUT 9 GOTO 1030
450 GOSUB 4530 ! RESET HPIB
500 S1(0)=SPOLL(901)
510 IF S1(0)#1 OR 0 THEN GOTO 1010 ! SRQ,ABNORM,BAT,EVENT,ERR,RESET
520 WAIT 3000
540 DISP "3421A TEST COMPLETE"
580 ! CHECKING 5335A TIMER
590 DISP "CHECKING 5335A"
600 ON TIMEOUT 9 GOTO 1050
640 GOSUB 4530 ! RESET HPIB
```

```
670 S1(0)=SPOLL(903)
680 IF S1(0)>1 THEN GOTO 1060 !
    SRQ,GATE,FAIL,ERR
690 WAIT 3000
700 GOSUB 2420 ! 5335A DIGNOS
710 DISP "5335A TEST COMPLETE"
730 WAIT 3000
740 !
750 ! CHECKING QC2000 PULSER
760 DISP "CHECKING QC2000"
770 ON TIMEOUT 9 GOTO 1070
810 GOSUB 4530 ! RESET HPIB
840 S1(0)=SPOLL(904)
850 IF S1(0)#0 THEN GOTO 1010
855 S2$="R4)a$"444444448444444
    8444444AT.05  BT.50   "
856 OUTPUT 903 USING "#,2A,30A,7
    A,14A" ; "PB";S2$,"TF1","AT.
    05  BT 5         "
860 WAIT 3000
870 GOSUB 3890 ! QC2000 DIGNOS
880 DISP "QC2000 TEST COMPLETE"
910 !
920 DISP "ALL DIAGNOSTICS COMPLE
    TED"
930 BEEP 600,100
940 WAIT 3000
950 CHAIN "TCC704"
960 !
970 BEEP @ DISP "DEVICE I/O TIME
     OUT - CHECK I/O"
980 GOSUB 4830 ! RESET HPIB
1000 DISP "TYPE 'INIT'" @ STOP
1010 !
1020 BEEP @ DISP "DEVICE REQUIRE
     S SERVICE" @ STOP
1030 !
1040 DISP "3421A NOT AVAILABLE"
     @ GOTO 570 ! SKIP TO NEXT
1050 !
1060 DISP "5335A NOT AVAILABLE"
     @ GOTO 740 ! SKIP TO NEXT
1070 !
1080 DISP "QC2000 NOT AVAILABLE"
     @ GOTO 910 ! SKIP TO NEXT
1090 !
1100 ! HPIB DIAGNOSTIC ROUTINE
1110 DISP "CHECK SWITCH AND HAND
     SHAKE"
1130 A2=0
1140 A1=53
1150 WIO 9,0;2
1160 WIO 9,1;230
1170 IF RIO(9,0)<128 THEN 1210
1180 A2=A2+1 @ IF A2>2 THEN GOSU
     B 1490
1190 IF A2=3 THEN 1210
1200 GOTO 1170
1210 WIO 9,0;0
1220 WIO 9,1;3
1230 WIO 9,0;2
1240 A2=A2+1 @ IF A2>4 THEN GOSU
     B 1510
1250 IF A2=4 THEN 1270
1260 GOTO 1230
1270 WIO 9,0;2
1280 WIO 9,1;120
1290 WIO 9,0;0
1300 IF RIO(9,0)<1 THEN 1360
1310 A1=RIO(9,1)
1320 IF RIO(9,0)#0 THEN GOSUB 15
     10
1330 IF A1>192 THEN A1=A1-192
1340 IF A1#53 THEN RETURN
1350 RETURN
1360 !
1370 DISP "STATUS TEST"
1380 ASSERT 9,64
1400 CONTROL 9,3 ; 0
1410 STATUS 9,0 ; B1,B2,B3,B4,B5
     ,B6
1420 IF B1#1 THEN GOSUB 1570
1430 IF B2#0 THEN GOSUB 1570
1440 IF B3#64 THEN GOSUB 1570
1450 IF B4#0 THEN GOSUB 1570
1460 IF B5#A1 THEN GOSUB 1570
1470 IF B6#160 THEN GOSUB 1570
1480 RETURN
1490 DISP "HANDSHAKE ERROR PROBA
     BLE";"PROCESSOR OR XLATOR F
     AILURE"
1500 RETURN
1510 DISP "XLATOR IS NOT CLEAR W
     HEN";"EXPECTED-PROBABLE XLA
     TOR OR";"PROCESSOR FAILURE"
1520 RETURN
1530 DISP "SWITCHES NOT READING
     AS SUSPECTED DEFAULT"
1540 A$=DTB$(A1)
1550 DISP "SWITCHES 2-7 READ AS
     "&A$[11,16]&"-EXPECTED 1101
     01"
1560 RETURN
1570 DISP "STATUS ERROR"
1580 DISP "STS BYTES=";B1;B2;B3;
     B4;B5;B6
1590 RETURN
1600 !
1610 ! 3421A DIAGNOSTIC ROUTINE"
1620 ON TIMEOUT 9 GOTO 970
1630 GOSUB 4530 ! RESET HPIB
1680 GOSUB 2350 ! STATUS
1700 ! INITIALIZATION CORRECT
1710 IF S1(5)#86 THEN 1790 ! MAS
     K
1720 IF S1(9)#255 THEN 1790 ! SC
     AN 1
1730 IF S1(10)#255 THEN 1790 ! S
     CAN 2
1740 IF S1(17)#17 THEN 1790 ! FU
     NCTION
1750 IF S1(18)#36 THEN 1790 ! RA
     NGE
1760 IF S1(19)#23 THEN 1790 ! VO
     LTMETER
1770 IF S1(20)#133 THEN 1790 ELS
     E 1800 ! RESOLUTION
1790 BEEP @ DISP "3421 NOT INITI
     ALIZING" @ GOSUB 2411 @ RET
     URN
1800 ! ABNORMAL CONDITION"
1810 IF BIT(S1(1),5) THEN 1020
1820 IF BIT(S1(1),3) THEN 1020
1830 ! MPX CARDS IN SLOTS 0,1?
1840 IF BIT(S1(6),0) THEN 1850 E
     LSE 1910 ! SLOT 0 MUX
1850 IF BIT(S1(6),1) THEN 1860 E
     LSE 1910 ! 1 MUX
1860 IF BIT(S1(6),2) THEN 1910 !
     2D
1870 IF BIT(S1(6),4) THEN 1910 !
     0D
1880 IF BIT(S1(6),5) THEN 1910 !
     1D
1890 IF BIT(S1(6),6) THEN 1910 !
     2M
1900 IF S1(7)#0 THEN 1910 ELSE 1
     920 ! ACTUATOR
1910 BEEP @ DISP "WRONG I/O EQPT
      CONFIGURATION" @ GOSUB 24
     11 @ RETURN
1920 ! RAM-ROM-A/D ERROR"
1930 FOR N=0 TO 6
1940 IF BIT(S1(3),N) THEN 1970
1950 NEXT N
```

```
1960 GOTO 1980
1970 BEEP @ DISP "RAM-ROM-A/D ER
     ROR" @ GOSUB 2411 @ RETURN
1980 ! DO RELAYS CLOSE?
1990 OUTPUT 901 ;"OPN"
2000 FOR M=0 TO 9
2010 OUTPUT 901 ;"CLS",M
2020 GOSUB 2350 ! STATUS
2030 S1(9)=BINAND(S1(9),63) ! MA
     SK OFF TOP BITS
2040 S1(10)=BINAND(S1(10),63)
2050 IF S1(9)#M THEN 2070
2060 IF S1(10)#M+16 THEN 2150
2070 OUTPUT 901 ;"OPN",M
2080 GOSUB 2350 ! STATUS
2090 S1(9)=BINAND(S1(9),15) ! MA
     SK OFF TOP BITS
2100 S1(10)=BINAND(S1(10),15)
2110 IF S1(9)#15 THEN 2150
2120 IF S1(10)#15 THEN 2150
2130 NEXT M
2140 GOTO 2160
2150 BEEP @ DISP "RELAY FAILURE"
     @ GOSUB 2411 @ RETURN
2160 ! MEASUREMENT SETUP OK?
2170 ON ERROR GOTO 2330
2180 SET TIMEOUT 9;70000
2181 OUTPUT 901 ;"F"
2182 ENTER 901 ; R$
2183 IF VAL(R$)>40 OR VAL(R$)<20
      THEN 2185 ELSE 2190
2185 DISP "REFERENCE JUNCTION OU
     T OF CAL" @ RETURN
2190 OUTPUT 901 ;"FN1-9"
2200 FOR M=1 TO 9
2210 ENTER 901 ; M1(M)
2220 ! IF M1(M)<90 OR M1(M)>110
     THEN 3330
2230 DISP M1(M)
2240 NEXT M
2245 OUTPUT 901 ;"OPN9"
2250 GOSUB 2350 ! STATUS
2260 IF S1(1)#0 THEN 2340
2270 IF S1(17)#36 THEN 2340
2280 IF S1(18)=36 OR S1(18)=41 T
     HEN 2290 ELSE 2340
2290 IF S1(19)#54 THEN 2340
2300 IF S1(20)#133 THEN 2340
2320 RETURN
2330 BEEP @ DISP "READING OUT OF
      TOLERANCE" @ RETURN
2340 BEEP @ DISP "SETUP FAILURE"
     @ GOSUB 2360 @ GOSUB 2411
     @ OFF ERROR @ RETURN
2350 !
2360 ! GET STATUS REG VALUES
2370 OUTPUT 901 ;"SR"
2380 FOR N=1 TO 24
2390 ENTER 901 ; S1(N)
2400 NEXT N
2410 RETURN
2411 !
2412 ! PRINT STATUS
2413 FOR N=1 TO 24
2414 B1$=DTB$(S1(N)) ! BIN
2415 H1$=DTH$(S1(N)) ! HEX
2416 PRINT "BYTE";N;"= ";B1$[9,1
     6];" = ";H1$[3,4];"H = ";CH
     R$(S1(N))
2417 NEXT N
2418 RETURN
2420 !
2430 ! 5335A DIAGNOSTIC ROUTINE
2435 OFF ERROR
2440 GOSUB 4530 ! RESET HPIB
2480 OUTPUT 903 ;"IN"
2490 S1(0)=SPOLL(903)
2500 IF BIT(S1(0),1) THEN 2690
2510 IF BIT(S1(0),2) THEN 2690
2520 IF BIT(S1(0),3) THEN 2690
2530 IF BIT(S1(0),6) THEN 2690
2540 IF BIT(S1(0),7) THEN 2690
2550 ! INITIALIZATION CORRECT
2560 OUTPUT 903 ;"PQ"
2570 ENTER 903 USING "#,30A" ; A
     $
2620 ! EVALUATE THE BYTES
2630 IF A$[1,1]#CHR$(1) THEN 270
     0
2640 IF A$[2,2]#CHR$(0) THEN 270
     0
2650 IF A$[3,3]#CHR$(0) THEN 270
     0
2660 IF A$[4,4]#CHR$(32) THEN 27
     00
2670 IF A$[5,5]#CHR$(32) THEN 27
     00
2680 IF A$[6,6]#CHR$(0) THEN 270
     0 ELSE 2710
2690 BEEP @ DISP "5335A REQUIRES
      SERVICE" @ RETURN
2700 BEEP @ DISP "TIMER INITIALI
     ZATION FAILURE" @ RETURN
2710 ! WITHIN CALIBRATION
2720 SET TIMEOUT 9;25000
2730 OUTPUT 903 ;"FN99"
2740 FOR N=1 TO 5
2750 ENTER 903 ; M$
2760 ! PRINT M$
2770 IF N=1 AND VAL(M$[2])#0 THE
     N PRINT M$
2780 IF N=2 AND VAL(M$[2])<4.9 O
     R N=2 AND VAL(M$[2])>5.1 TH
     EN PRINT M$
2790 IF N=3 AND VAL(M$[2])<2.9 O
     R N=3 AND VAL(M$[2])>3.1 TH
     EN PRINT M$
2800 IF N=4 AND VAL(M$[2])<-5.1
     OR N=4 AND VAL(M$[2])>-5 TH
     EN PRINT M$
2810 IF N=5 AND VAL(M$[2])#0 THE
     N PRINT M$
2820 NEXT N
2830 OUTPUT 903 ;"MS10"
2840 FOR N=1 TO 3
2850 ENTER 903 ; M$
2860 IF VAL(M$[2])#0 THEN PRINT
     M$
2870 NEXT N
2880 OUTPUT 903 ;"MS26"
2890 ENTER 903 ; M$
2900 IF VAL(M$[2])<-5.1 OR VAL(M
     $[2])>-4.9 THEN PRINT M$
2910 OUTPUT 903 ;"RH1MS27"
2920 ENTER 903 ; M$
2930 IF VAL(M$[2])<1800 OR VAL(M
     $[2])>2000 THEN PRINT M$
2940 OUTPUT 903 ;"RH0MS28"
2950 ENTER 903 ; M$
2960 IF VAL(M$[2])<4.9 OR VAL(M$
     [2])>5.1 THEN PRINT M$
2970 OUTPUT 903 ;"RH1MS28"
2980 ENTER 903 ; M$
2990 IF VAL(M$[2])<3500 OR VAL(M
     $[2])>3700 THEN PRINT M$
3000 OUTPUT 903 ;"RH0MS31"
3010 ENTER 903 ; M$
3020 IF VAL(M$[2])<4.9 OR VAL(M$
     [2])>5.1 THEN PRINT M$
3030 OUTPUT 903 ;"RH1MS31"
3040 ENTER 903 ; M$
3050 IF VAL(M$[2])<3500 OR VAL(M
     $[2])>3700 THEN PRINT M$
3060 OUTPUT 903 ;"RH0MS32"
3070 ENTER 903 ; M$
3080 IF VAL(M$[2])<2.9 OR VAL(M$
```

```
         [2])>371 THEN PRINT M$
3090 OUTPUT 903 ;"RH1MS32"
3100 ENTER 903 ; M$
3110 IF VAL(M$[2])<2800 OR VAL(M
     $[2])>3000 THEN PRINT M$
3120 OUTPUT 903 ;"RH0MS33"
3130 ENTER 903 ; M$
3140 IF VAL(M$[2])<-5.2 OR VAL(M
     $[2])>-5 THEN PRINT M$
3150 OUTPUT 903 ;"RH1MS33"
3160 ENTER 903 ; M$
3170 IF VAL(M$[2])<115 OR VAL(M$
     [2])>125 THEN PRINT M$
3180 OUTPUT 903 ;"IN"
3194 RETURN
3195 !
3880 !
3890 !
3900 ! LOAD QC2000 SETTINGS
3910 DISP "LOADING QC2000 DATABA
     SE"
3920 ! SET TIMEOUT 9;3000
3930 ! ON TIMEOUT 9 GOTO 1700
3940 !
3950 ! LOCK OUT FRONT PANEL
3960 ON ERROR GOTO 4150
3970 GOSUB 5790 ! LOCKOUT
3980 GOSUB 5790 ! LOCKOUT
3985 N=1
3990 GOSUB 5660 ! UP-LOAD #1
4000 GOSUB 5710 ! GET CURRENT SE
     TUP
4010 IF S2$[200,215]#C0$[2,17] T
     HEN 4013
4011 IF S2$[217,222]#C0$[19,24]
     THEN 4013
4012 IF S2$[216,216]="L" OR S2$[
     216,216]="R" THEN GOTO 4020
4013 DISP "CONFIGURATION CHANGE"
     @ STOP
4020 S1$=S2$
4040 GOSUB 5430 ! STORE SETUP
4050 GOSUB 4610 ! AGC
4060 GOSUB 5200 ! SAMPLE
4070 GOSUB 5840 ! SWEEP LENGTH
4080 GOSUB 5970 ! BLOCK DELAY
4090 GOSUB 6060 ! DIVISOR
4100 GOSUB 5430 ! STORE SETUP
4110 DISP "QC2000 DATABASE LOADE
     D"
4120 ! BEEP 915,75
4130 RETURN
4140 !
4150 BEEP @ DISP "QC2000 NOT ON
     LINE" @ GOSUB 4530
4160 RETURN
4170 BEEP @ DISP "QC2000 REQUIRE
     S SERVICE"
4180 ! PRINT ALL STATUS BYTES
4190 FOR N=1 TO 256
4200 B1$=DTB$(NUM(S2$[N,N])) ! B
     IN
4210 H1$=DTH$(NUM(S2$[N,N])) ! H
     EX
4220 PRINT USING 4230 ; N,B1$[9,
     12],B1$[13,16],H1$[3,4],S2$
     [N,N]
4230 IMAGE "BYTE ",DDD," = ",AAA
     A,AAAA," = ",AA,"H = ",A
4240 NEXT N
4250 RETURN
4260 !
4270 ! P/N FORMAT
4280 BEEP 50,50
4290 DISP "PART NUMBER" @ INPUT
     P2$
4300 P1$="000000000000000"
4310 N=14
4320 FOR N1=LEN(P2$) TO 1 STEP -
     1 ! BUILD R TO L
4330 IF P2$[N1,N1]="-" THEN 4360
     ! SKIP "-"
4340 P1$[N,N]=P2$[N1,N1]
4350 N=N-1
4360 NEXT N1
4370 P2$=P1$
4380 RETURN
4390 !
4400 N=11
4410 GOTO 4350
4420 !
4430 ! P/N CHECK/SEARCH
4440 FOR R2=1 TO P2
4450 R1=R2
4460 ON ERROR GOTO 4510
4470 READ# 2,R2 ; P1$
4480 IF P1$[1,14]=P2$[1,14] THEN
     OFF ERROR @ RETURN ! MATCH
     DBA
4490 NEXT R2
4500 !
4510 DISP "NOT IN DATABASE" @ OF
     F ERROR @ GOTO 4520
4520 !
4530 !
4540 ! RESET HPIB
4550 ABORTIO 9
4560 SEND 9 ; UNT
4570 RESET 9
4580 CLEAR 9
4590 WAIT 5000
4600 RETURN
4610 !
4620 ! AUTO GAIN CTL FOR QC2000
4630 SET TIMEOUT 9;200
4640 ON TIMEOUT 9 GOTO 5380
4650 OUTPUT 3 ;"DR0"
4660 GOSUB 5650 ! BIT MASKS
4670 G0=2, G1=1 ! GAIN:60dB
4680 S1$[46,46]=CHR$(B1(1)) @ S1
     $[47,123]=CHR$(B1(2))
4690 FOR M=3 TO 25 STEP 2
4700 IOBUFFER S4$
4710 S4$=S1$ ! UPDATE CONFIG
4720 S4$[46,46]=CHR$(BINIOR(B1(M
     ),NUM(S4$[46,46])))
4730 S4$[47,47]=CHR$(BINIOR(B1(M
     +1),NUM(S4$[47,47])))
4740 S3$[1,2]=S4$[46,47]
4750 GOSUB 5530 ! PGM MODULE
4760 IF G1(M)=1 THEN WAIT 1000
4770 IF G1(M)=.5 THEN WAIT 1000
4780 GOSUB 5200 ! SIG LEVEL
4790 IF FLAG(1) THEN S1$[46,47]=
     S3$[1,2] @ G0=G0-G1(M)
4810 NEXT M
4820 IOBUFFER S4$
4830 S4$=S1$ ! FINAL GAIN SLCTD
4840 GOSUB 5530 ! PGM MODULE
4850 RETURN
4860 !
4870 ! SET SCREEN
4880 GOSUB 5200 ! SAMPLE
4890 S1$[35,36]="△◁"
4900 S1$[7,8]="◁◁"
4910 IOBUFFER S4$
4920 S4$=S1$ ! FINAL CONFIG
4930 GOSUB 5530 ! FINAL SETUP
4940 RETURN
4950 !
4960 ! SET SCREEN
4970 GOSUB 5200 ! SAMPLE
4980 GOSUB 5840 ! SWEEP LEGNTH
4990 GOSUB 5970 ! BLOCK DELAY
5000 IOBUFFER S4$
5010 S4$=S1$ ! FINAL CONFIG
```

```
5020 GOSUB 5530 ! FINAL SETUP
5030 RETURN
5040 !
5050 ! DEFINE BIT MASKS
5060 B1(3)=BTD("01000000") @ B1(
     4)=BTD("00000000") @ G1(3)=
     16 ! 16 dB
5070 B1(5)=BTD("00100000") @ B1(
     6)=BTD("00000000") @ G1(5)=
     16 ! 16 dB
5080 B1(9)=BTD("00010000") @ B1(
     10)=BTD("00000000") @ G1(9)
     =8 ! 08 dB
5090 B1(1)=BTD("00000000") @ B1(
     2)=BTD("00100000") @ G1(1)=
     20 ! 20 dB
5100 B1(7)=BTD("00000000") @ B1(
     8)=BTD("00010000") @ G1(7)=
     10 ! 10 dB
5110 B1(11)=BTD("00000000") @ B1
     (12)=BTD("00000001") @ G1(1
     1)=16 ! 16 dB
5120 B1(13)=BTD("00000000") @ B1
     (14)=BTD("00000010") @ G1(1
     3)=8 ! 08 dB
5130 B1(15)=BTD("00000000") @ B1
     (16)=BTD("00000100") @ G1(1
     5)=4 ! 04 dB
5140 B1(17)=BTD("00000000") @ B1
     (18)=BTD("00001000") @ G1(1
     7)=2 ! 02 dB
5150 B1(19)=BTD("00001000") @ B1
     (20)=BTD("00000000") @ G1(1
     9)=4 ! 04 dB
5160 B1(21)=BTD("00000100") @ B1
     (22)=BTD("00000000") @ G1(2
     1)=2 ! 02 dB
5170 B1(23)=BTD("00000010") @ B1
     (24)=BTD("00000000") @ G1(2
     3)=1 ! 01 dB
5180 B1(25)=BTD("00000001") @ B1
     (26)=BTD("00000000") @ G1(2
     5)=.5 ! .5 dB
5190 RETURN
5200 !
5210 ! CHECK FOR SIGNAL LEVEL
5220 SET TIMEOUT 9;200
5230 ON TIMEOUT 9 GOTO 5380
5240 M2=0
5250 OUTPUT 903 ;"WA1" @ ENTER 9
     03 ; M1$
5260 IOBUFFER M1$
5270 TRANSFER 903 TO M1$ FHS
5280 FOR N=1 TO 10
5290 SFLAG 1
5300 M0(N)=VAL(M1$[21*(N-1)+2,21
     *(N-1)+19])
5310 IF M0(N)>M6 THEN CFLAG 1 !
     LOST SIGNAL
5320 M2=M2+M0(N)
5330 NEXT
5340 OUTPUT 903 ;"WA0"
5350 M2=M2/10
5360 SEND 9 ; UNT
5370 RETURN
5380 !
5390 ! LOST SIGNAL ON 5335
5400 ABORTIO 9
5410 CFLAG 1
5420 RETURN
5430 !
5440 ! STORE NEW SETUP
5445 S1$=S2$
5450 IOBUFFER S4$
5460 S4$=S2$[1,256] ! UPDATE CON
     FIGURATION
5470 GOSUB 5530 ! PGM MODULE
5480 GOSUB 5600 ! STORE IN #1
5490 GOSUB 5660 ! RECALL #1
5500 GOSUB 5710 ! GET CRNT SETUP
5510 IF S2$[1,222]#S1$[1,222] TH
     EN GOSUB 4170
5520 RETURN
5530 !
5540 ! SEND PGM MODULE COMMAND
5550 S4$=S4$[1,254] ! MAKE ROOM
     FOR <CR>&<LF>
5560 SEND 9 ; MTA UNL LISTEN 4 D
     ATA HTD("C1"),HTD("0F"),HTD
     ("C7")
5570 TRANSFER S4$ TO 904 FHS
5580 P=SPOLL(904) @ WAIT 100
5590 RETURN
5600 !
5610 ! STORE IN BLOCK 1
5620 SEND 9 ; MTA UNL LISTEN 4 D
     ATA HTD("C4"),N,HTD("00")
5630 WAIT 2600
5640 P=SPOLL(904)
5650 RETURN
5660 !
5670 ! RECALL SETUP
5680 SEND 9 ; MTA UNL LISTEN 4 D
     ATA HTD("C3"),N,HTD("00")
5690 P=SPOLL(904) @ WAIT 100
5700 RETURN
5710 !
5720 ! GET SETTING #1
5730 IOBUFFER S2$
5740 SEND 9 ; MTA UNL LISTEN 4 D
     ATA HTD("C2"),HTD("00"),HTD
     ("00")
5750 TRANSFER 904 TO S2$ FHS
5770 P=SPOLL(904) @ IF P#0 THEN
     GOSUB 4170
5780 RETURN
5790 !
5800 ! LOCKOUT FRONT PANEL
5810 SEND 9 ; MTA UNL LISTEN 4 D
     ATA HTD("C7"),HTD("45"),HTD
     ("00")
5820 P=SPOLL(904)
5830 RETURN
5840 !
5850 ! SET SWEEP LENGTH
5900 S1$[35,35]=CHR$(2)
5940 IF M2<.001 THEN S1$[36,36]=
     CHR$(0)
5960 RETURN
5970 !
5980 ! SET BLK DELAY TO CNTR SIG
6000 T6=IP((M2-.000025)/(4*.0000
     128))
6020 T5=IP((M2-.000025-4*.000012
     8*T6)/(4*.00000005))
6030 S1$[8,8]=CHR$(T6)
6040 S1$[7,7]=CHR$(T5)
6050 RETURN
6060 !
6070 ! SET DIVISOR FOR ECHO/THRU
6080 S3$=S2$[58,58]
6090 ! IF BIT(NUM(S3$),5) THEN O
     4=1 ELSE O4=2
6100 RETURN
6110 !
6120 ! GET 100 TIME SAMPLES
6130 GOSUB 4610 ! AGC
6140 GOSUB 4950 ! SET SCREEN
6150 BEEP 60,200
6160 ! GET SELECTION OF SAMPLES
6170 OUTPUT 903 ;"WA1" @ ENTER 9
     03 ; M$
6180 SET TIMEOUT 9,10000
6190 ON TIMEOUT 9 GOTO 5380 ! RE
     CYCLE
```

```
6200 IOBUFFER M$
6210 TRANSFER 903 TO M$ FHS
6220 SEND 9 ; UNT
6230 FOR N=1 TO 100
6240 M0(N)=VAL(M$[21*(N-1)+2,21*
     (N-1)+19]) ! NUM EQUIV
6250 NEXT N
6260 OUTPUT 903 ,"WA0"
6270 BEEP 80,200
6280 OFF ERROR
6290 RETURN
6300 !
6310 ! ALL WITHIN D9 WINDOW
6320 M0(0)=INF @ M0(101)=EPS
6330 FOR N=1 TO 100
6340 IF M0(N)<M0(0) THEN M0(0)=M
     0(N)
6350 IF M0(N)>M0(101) THEN M0(10
     1)=M0(N)
6360 NEXT N
6370 IF M0(0)>M6 THEN GOTO 3880
6380 IF M0(101)-M0(0)>D9 THEN 64
     20
6390 N1=0 @ N2=101
6400 RETURN
6410 !
6420 ! BUBBLE SORT SAMPLES
6430 FOR N=1 TO 99
6440 M3=M0(N)
6450 N3=N
6460 FOR N2=N+1 TO 100
6470 IF M0(N2)<M3 THEN M3=M0(N2)
     @ N3=N2 ! CHECK FOR LOWER
6480 NEXT N2
6490 M0(N3)=M0(N) @ M0(N)=M3 ! S
     WAP
6500 NEXT N
6510 !
6520 ! ASSUME MEDIAN VALUE IS GO
     OD
6530 M3=(M0(50)+M0(51))/2
6540 !
6550 ! GET MIN GOOD SAMPLE LIMIT
6560 FOR N4=49 TO 1 STEP -1
6570 IF M3-M0(N4)>D9 THEN GOTO 6
     590 ! FROM MIDDLE DOWN
6580 NEXT N4
6590 !
6600 ! GET MAX GOOD SAMPLE LIMIT
6610 FOR N2=52 TO 100
6620 IF M0(N2)-M3>D9 THEN GOTO 6
     650 ! FROM MIDDLE UP
6630 NEXT N2
6640 RETURN
6650 !

10 !    FPSMOD  1988
20 !    0719881500   0805860830
30 CLEAR
40 ! INITIALIZE
50 DISP "FRONT PANEL MODIFICATI
   ON ROUTINE"
70 ENABLE KBD BTD("11111111") @
    WAIT 3000
80 !
90 ASSIGN# 1 TO "FPSDAT"
100 ASSIGN# 2 TO "P/NDAT"
110 !
120 DIM B1$[16],H1$[4],M1$[218]
140 DIM P1$[29],P2$[29],R$[16]
150 DIM S1$[264],S2$[264],S3$[2]
    ,S4$[264],S5$[16],S6$[4],S7$
    [4],S8$[50]
180 !
190 ! B1$=BINARY EQUIVALENT
200 ! H1$=HEX EQUIVALENT
205 ! M1$=AGC TIME SAMPLES (10)
210 ! P1$=PART NUMBER INPUT
220 ! P2$=PART NUMBER MEMORY
225 ! R$=RESPONSE TO INPUT ?
230 ! S1$=PART SETUP LIBRARY
240 ! S2$=QC2000 PGM BYTES
250 ! S3$=QC2000 RCVR GAIN BYTE
260 ! S4$=5335 PROGRAM BYTES
270 ! S5$=BIN EQIV M0,MN,MS
280 ! S6$=NUM EQIV S5$ LSB
290 ! S7$=NUM EQIV S5$ MSB
300 ! S8$=OFF,NORM,SCALE ASCII
301 !
302 DIM B1(26),G1(26),M0(10),S1(
    30)
303 !
304 ! B1()=RCVR GAIN BIT MASK
305 ! G1()=RCVR GAIN BIT VALUE
306 ! M0()=NUM TRNSIT TIME SMPL
307 ! S1()=STATUS BYTE ARRAY
308 !
309 INTEGER L1,M,N,N1,N2,P,R,R1,
    R2,T5,T6
310 !
311 ! L1=MAX # OF P/N RECORDS
312 ! M=AGC GAIN BYTE PNTR
313 ! N=GENERAL POINTER/COUNTER
314 ! N1=P/N BUILD POINTER
315 ! N2=GOOD SMPL COUNTER
316 ! P=RESULTS OF SER. POLL
317 ! R=COMB STORAGE POINTER
318 ! R1=REC PNTR F/ FPSDAT
319 ! R2=REC PNTR F/ P/NDAT
320 ! T5=BLK DLY LSB
321 ! T6=BLK DLY MSB
322 !
323 REAL G0,M2,M6,S2
324 !
330 ! G0=NUM GAIN SETTING
340 ! M2=AVG PROPAGATION TIME
350 ! M6=MAX TIME LIMIT
370 ! S2=5335 AT,BT,TI CONSTANT
410 !
420 CLEAR
440 S2$[238]="#" @ S1$=" "
460 L1=99
470 M6=.009
480 !
490 SET TIMEOUT 9;2000
500 ON TIMEOUT 9 GOTO 1090
510 !
520 ! MAIN MENU
530 CLEAR
540 ON KEY# 1,"CHANGE" GOSUB 640
550 ON KEY# 2," ADD " GOSUB 760
560 ON KEY# 3," PRINT" GOSUB 880
570 ON KEY# 4,"MESURE" GOSUB 106
    5
580 ON KEY# 5,"DELETE" GOSUB 131
    0
590 ON KEY# 6,"AD P/N" GOSUB 110
    0
600 OFF KEY# 7
610 ON KEY# 8," QUIT " GOSUB 101
    0
620 KEY LABEL @ DISP "MAIN MENU"
630 GOTO 540 ! WAIT FOR SOFTKEY
640 !
650 ! CHANGE MENU
660 ON KEY# 1," TEMP " GOSUB 321
    0
670 ON KEY# 2," TIMER" GOSUB 216
    0
680 ON KEY# 3,"QC2000" GOSUB 388
    0
690 ON KEY# 4," COMB " GOSUB 178
    0
700 OFF KEY# 5
710 OFF KEY# 6
720 OFF KEY# 7
```

```
730 ON KEY# 8," QUIT " GOTO 530
740 KEY LABEL @ DISP "CHANGE MEN
    U"
750 GOTO 660 ! WAIT FOR SOFTKEY
760 !
770 ! ADD MENU
780 ON KEY# 1," TEMP " GOSUB 321
    0
790 ON KEY# 2," TIMER" GOSUB 216
    0
800 ON KEY# 3,"QC2000" GOSUB 388
    0
810 OFF KEY# 4
820 OFF KEY# 5
830 OFF KEY# 6
840 OFF KEY# 7
850 ON KEY# 8," QUIT " GOTO 530
860 KEY LABEL @ DISP "ADD MENU"
870 GOTO 780
880 !
890 ! PRINT MENU
900 ON KEY# 1," TEMP " GOSUB 303
    0
910 ON KEY# 2," TIMER" GOSUB 267
    0
920 ON KEY# 3,"QC2000" GOSUB 427
    0
930 OFF KEY# 4
940 ON KEY# 5,"  P/N " GOSUB 168
    0
950 ON KEY# 6," COMB " GOSUB 198
    0
960 OFF KEY# 7
970 ON KEY# 8," QUIT " GOTO 530
980 KEY LABEL @ DISP "PRINT MENU
    "
990 GOTO 900 ! WAIT FOR SFTKEY
1000 !
1010 ! >>>DONE<<<
1020 CLEAR
1030 ASSIGN# 1 TO * ! CLOSE FFSD
     AT
1040 ASSIGN# 2 TO * ! CLOSE P/ND
     AT
1050 DISP "DONE"
1060 STOP
1061 !
1065 CHAIN "TCC704"
1070 !
1080 DISP "FILE FULL" @ GOTO 107
     0 ! CLOSE FILES
1085 !
1090 BEEP @ CLEAR @ DISP "DEVICE
      TIMEOUT" @ WAIT 3000 @ GOT
     O 510 ! MAIN MENU
1100 !
1110 ! P/N FORMAT
1120 DISP "PART NUMBER" @ INPUT
     P1$
1130 P2$[1,14]="00000000000000"
1140 N=14
1150 FOR N1=LEN(P1$) TO 1 STEP -
     1 ! BUILD R TO L
1160 IF P1$[N1,N1]="-" THEN N=11
     @ GOTO 1190 ! SKIP "-"
1170 P2$[N,N]=P1$[N1,N1]
1180 N=N-1
1190 NEXT N1
1200 P1$[1,14]=P2$[1,14]
1210 !
1220 ! P/N CHECK
1230 FOR R2=1 TO L1
1240 R1=R2
1250 ON ERROR GOTO 1440 ! EOF
1260 READ# 2,R2 ; P2$
1270 IF P2$[1,14]=P1$[1,14] THEN
     OFF ERROR @ RETURN ! MATCH
     DBA
1280 NEXT R2
1290 !

1300 DISP "FILE FULL" @ GOTO 106
     0 ! CLOSE FILES
1310 !
1320 ! P/N DELETE
1330 DISP "DELETE WHICH PART NUM
     BER" @ INPUT P1$
1340 IF P1$="" THEN 1430
1350 GOSUB 1130 ! FORMAT&SEARCH
1360 DISP "DELETE" @ DISP P2$[1,
     11];"-";P2$[12,14] @ DISP P
     2$[15,18];" ";P2$[19,23],".
     ";P2$[24,29]
1370 INPUT R$@ IF R$#"Y" THEN 14
     30
1380 P2$=""
1390 S1$=" " @ S1$[238,238]="4"
1400 PRINT# 2,R2 ; P2$ ! STORE B
     LANK
1410 PRINT# 1,R1 ; S1$ ! STORE B
     LANK
1430 CLEAR @ KEY LABEL @ RETURN
1440 !
1450 ! >>>P/N ADD<<<
1460 CLEAR
1470 OFF ERROR
1480 IF P1$="00000000000000" THE
     N RETURN
1490 DISP "ADD:"
1500 DISP P1$[1,11];"-";P1$[12,1
     4]
1510 DISP "TO PART NUMBER LIBRAR
     Y?" @ INPUT R$
1520 IF R$#"Y" THEN GOTO 1100
1530 FOR R2=1 TO L1
1540 ON ERROR GOTO 1290 ! EOF
1550 READ# 2,R2 ; P2$
1560 DISP P2$
1570 OFF ERROR
1580 IF P2$[1,14]="
     " THEN 1610 ! STORE
1590 IF P2$="" THEN 1610 ! STORE
1600 NEXT R2
1610 PRINT# 2,R2 ; P1$ ! STORE P
     /N
1620 R1=R2
1630 GOSUB 1840 ! COMBINATIONS
1640 CLEAR @ KEY LABEL @ RETURN
1650 !
1660 PRINT @ PRINT @ PRINT "PART
      NUMBER: ";P1$[1,11];"-";P1
     $[12,14] @ PRINT @ PRINT
1670 RETURN
1680 !
1690 ! PRINT P/N IN DATABASE
1700 PRINT @ PRINT @ PRINT ">>>P
     ART NUMBERS IN DATABASE<<<"
     @ PRINT
1710 FOR R2=1 TO L1
1720 ON ERROR GOTO 1770 ! EOF
1730 READ# 2,R2 ; P1$ ! P/N
1740 IF P1$[1,14]="
     " THEN GOTO 1760 ! SKIP BL
     ANKS
1750 PRINT "PART NUMBER: ";P1$[1
     ,11];"-";P1$[12,14]
1760 NEXT R2
1770 CLEAR @ KEY LABEL @ RETURN
1780 !
1790 ! CHANGE COMBINATIONS
1800 GOSUB 1100 ! FORMAT&SEARCH
1810 DISP USING 2100
1820 DISP USING 2120 ; P2$[15,18
     ],P2$[19,23],P2$[24,29] ! D
     BA
1830 GOTO 1840 ! COMBINATIONS
1840 !
1850 ! COMBINATION ADD ROUTINE
1860 R=R2
1870 DISP "TRANSDUCER NUMBER" @
```

```
1880  INPUT R$
      P1$[15,18]=R$
1890  DISP "WEDGE NUMBER" @ INPUT
      R$
1900  P1$[19,23]=R$
1910  DISP "HOLDER NUMBER" @ INPU
      T R$
1920  P1$[24,29]=R$
1930  PRINT# 2,R ; P1$ ! STORE CO
      MB
1940  CLEAR
1950  DISP "MORE COMBINATIONS" @
      INPUT R$
1960  IF R$="Y" OR R$="YES" THEN
      R=R+1 @ GOTO 1870
1970  CLEAR @ KEY LABEL @ RETURN
1980  !
1990  ! TDX/WEDGE/HOLDER PRNT PGM
2000  CLEAR
2010  P1$="00000000000000"
2020  PRINT @ PRINT @ PRINT "COMB
      INATIONS OF WEDGES AND TDX"
2030  FOR N=1 TO L1
2040  ON ERROR GOTO 2150 ! EOF
2050  READ# 2,N ; P2$ ! P/N
2060  IF P2$[1,14]="
      " THEN GOTO 2130 ! SKIP BL
      ANKS
2080  IF P2$[1,14]#P1$[1,14] THEN
      PRINT @ PRINT "PART NUMBER
      : ";P2$[1,11];"-";P2$[12,14
      ]
2090  PRINT USING 2100
2100  IMAGE "  TDX       WEDGE
        ASSY"
2110  PRINT USING 2120 ; P2$[15,1
      8],P2$[19,23],P2$[24,29]
2120  IMAGE 5A,5X,5A,5X,6A
2130  P1$=P2$ ! SKIP IDENTICAL P/
      N
2140  NEXT N
2150  OFF ERROR @ KEY LABEL @ RET
      URN
2160  !
2170  ! CHANGE 5335A FRONT PANEL
2180  GOSUB 1100 ! FORMAT&SEARCH
2190  ON ERROR GOTO 2240 ! EOF
2200  READ# 1,R1 ; S1$ ! GET BINA
      RY RECORD
2210  GOSUB 2370 ! STATUS
2220  OUTPUT 903 USING "#,2A,30A"
      ; "PB",S1$[65,94] ! LOAD 5
      335A
2221  OUTPUT 903 ;"TR1",S1$[95,10
      8] ! LOAD REMOTE TRIGGER LE
      VELS
2230  IF S1$[111,111]#"-" THEN OU
      TPUT 903 ;S1$[109,118] ! ST
      ORE SETUP
2240  OFF ERROR ! EOF
2250  S1$[238,238]="#" @ S2$[1,23
      7]=S1$[1,237]
2260  OFF ERROR ! EOF
2270  GOSUB 2370 ! STATUS
2280  LOCAL 903
2290  OFF KEY# 2
2300  OFF KEY# 3
2310  OFF KEY# 4
2320  S2$[95,96]="AT" @ S2$[102,1
      03]="BT" @ S2$[109,110]="GA
      "
2330  DISP "CHANGE FRONT PANEL AS
       DESIRED";"THEN PRESS K1" @
       BEEP 100,50 @ BEEP 130,100
2340  ON KEY# 1,"STORE" GOTO 2460
2350  KEY LABEL
2360  GOTO 2360 ! WAIT FOR SOFTKE
      Y
2370  !
2380  ! POLL AND CHECK STATUS
2390  S1(0)=SPOLL(903)
2400  IF BIT(S1(0),2) THEN 2440 !
       ERROR
2410  IF BIT(S1,3),3) THEN 2440 !
       FAIL
2420  IF BIT(S1(0),6) THEN 2440 !
       SERVICE REQUEST
2430  RETURN
2440  PRINT "5335A STATUS ERROR"
2450  GOTO 2730 ! PRINT STAT BYTE
      S
2460  !
2461  ! FRONT PANEL STORE
2470  CLEAR
2480  DISP "A TRIG LEVEL" @ BEEP
      150,200 @ INPUT S2
2490  S2$[97,101]=VAL$(IP(S2*100)
      /100)
2500  DISP "B TRIG LEVEL" @ BEEP
      180,200 @ INPUT S2
2510  S2$[104,108]=VAL$(IP(S2*100
      )/100)
2520  DISP "TIME INT. DELAY" @ BE
      EP 210,200 @ INPUT S2
2530  S2$[111,118]=VAL$(S2)
2533  OUTPUT 903 ;"TR1",S2$[95,10
      8] ! REMOTE TRIGGER SETTING
      S
2535  OUTPUT 903 ;"PQ"
2536  ENTER 903 USING "#,30A" ; S
      4$ ! GET PANEL SETTINGS
2540  OUTPUT 903 USING "#,2A,30A"
      ; "PB",S4$ ! STORE SETTING
      S
2542  OUTPUT 903 ;"TR1",S2$[95,10
      8] ! REMOTE TRIGGER SETTING
      S
2550  IF S2$[111,111]#"-" THEN OU
      TPUT 903 ;"TR1",S2$[95,118]
       ! STORE SETUP (GA >0)
2560  GOSUB 2370 ! STATUS
2570  OUTPUT 903 ;"PQ"
2580  ENTER 903 USING "#,30A" ; S
      4$ ! RETREIVE SETTINGS
2590  S1$=S1$[1,64]&S4$&S2$[95,12
      8]&S1$[129,238]
2600  GOSUB 2370 ! STATUS
2610  PRINT# 1,R1 ; S1$ ! SAVE BI
      NARY RECORD
2615  READ# 1,R1 ; S1$ ! RETREIVE
       BINARY RECORD
2620  GOSUB 2370 ! STATUS
2630  OUTPUT 903 ;"PQ"
2640  ENTER 903 USING "#,30A" ; S
      4$ ! CHECK PGM
2650  IF S4$#S1$[65,94] THEN  .
      T "DATA BASE LOADING ERROR"
2660  CLEAR @ RETURN
2670  !
2680  ! DECODE 5335A PGM BYTES
2690  GOSUB 1100 ! FORMAT&SEARCH
2700  ON ERROR GOTO 2720 ! EOF
2710  READ# 1,R1 ; S1$ ! BIN VALU
      E
2720  OFF ERROR @ S1$[238,238]="#
      "
2730  !
2740  ! STATUS BYTE PRINT ROUTINE
2750  GOSUB 1660 ! P/N HEADER
2760  PRINT "TIMER DATABASE";"SEE
       5335A TBL 3-6B UPDATE 4/25
      /85"
2770  FOR N=1+64 TO 30+64
2780  B1$=DTB$(NUM(S1$[N,N])) @ B
      1$=B1$[9,16]
2790  H1$=DTH$(NUM(S1$[N,N])) ! H
      EX
```

```
2800 PRINT "BYTE";N-64;"= ";B1$;
     " = ";H1$[3,4];"H = ";CHR$(
     NUM(S1$[N,N]))
2810 NEXT N
2820 GOSUB 3700 ! OFST/NRM/SCL
2830 PRINT "OFFSET =";S8$[2,17]
2840 PRINT "NORMALIZE =";S8$[19,
     33]
2850 PRINT "SCALE =";S8$[34,49]
2860 PRINT "A TRIGGER =";S1$[97,
     101]
2870 PRINT "B TRIGGER =";S1$[104
     ,108]
2880 PRINT "TIME DELAY =";S1$[11
     1,118]
2890 KEY LABEL @ RETURN
2900 !
2910 ! POLL 3421 & GET STATUS
2920 GOSUB 3410
2930 OUTPUT 901 ;"SR"
2940 FOR N=1 TO 24
2950 ENTER 901 ; S1(N)
2960 S2$[32+N,32+N]=CHR$(S1(N))
2970 NEXT N
2980 IF BIT(S1(0),2) THEN 3050 !
     ERROR
2990 IF BIT(S1(0),3) THEN 3050 !
     FAIL
3000 IF BIT(S1(0),6) THEN 3050 !
     SRQ
3010 IF BIT(S1(1),1) THEN 3050 !
     POWER ON RESET
3020 IF BIT(S1(1),5) THEN 3050 !
     ABNORMAL
3030 IF BIT(S1(1),6) THEN 3050 !
     SRQ
3040 RETURN
3050 !
3060 ! PRINT 3421 STATUS BYTES
3070 PRINT "3421A STATUS ERROR"
3080 GOSUB 1100 ! FORMAT&SEARCH
3090 GOSUB 1660 ! P/N HEADER
3100 PRINT "TEMPERATURE SENSOR D
     ATABASE";"SEE PG F-6, 3056D
     L SYS OP MANUAL"
3110 ON ERROR GOTO 3130 ! EOF
3120 READ# 1,R1 ; S1$
3130 OFF ERROR @ S1$[238,238]="#
     "
3140 IF S1$[17,32]="
     " THEN PRINT S1$[1,16]
     @ RETURN ! COMMAND STRING
3150 FOR N=1+32 TO 24+32 ! PRINT
     STATUS
3160 B1$=DTB$(NUM(S1$[N,N])) !
     BIN
3170 H1$=DTH$(NUM(S1$[N,N])) !
     HEX
3180 PRINT "BYTE";N-32;"= ";B1$[
     9,16];" = ";H1$[3,4];"H = "
     ;S1$[N,N]
3190 NEXT N
3200 KEY LABEL @ RETURN
3210 !
3220 ! ADD 3421A SETUP
3230 ! SEE PAGE F-3 IN 3421A MAN
     UAL FOR COMMANDS
3240 CLEAR
3250 SET TIMEOUT 9;20000
3260 GOSUB 1100 ! FORMAT&SEARCH
3270 ON ERROR GOTO 3290 ! EOF
3280 READ# 1,R1 ; S1$
3290 OFF ERROR ! EOF
3300 S1$[238,238]="#"
3310 DISP "ADVANCED (A) OR STAND
     ARD (S) CMD" @ INPUT R$
3320 IF R$="A" THEN 3430
3330 DISP "STANDARD COMMAND" @ I
     NPUT R$
3340 S2$[1,32]=R$
3350 GOSUB 2900 ! STATUS
3360 S1$=S2$[1,64]&S1$[65,237]
3370 PRINT# 1,R1 ; S1$ ! SAVE SE
     TUP
3380 OUTPUT 901 ;S2$[1,16]
3390 GOSUB 2900 ! STATUS
3400 CLEAR @ KEY LABEL @ RETURN
3410 !
3420 ! ENTER AND DISP READING
3430 S1(0)=SPOLL(901)
3440 IF BIT(S1(0),0) AND BIT(S1(
     0),3) THEN 3460
3450 RETURN
3460 ENTER 901 ; R$@ DISP R$
3470 GOTO 3430
3480 S2$[17,32]="F N Z G  R  RT
     "
3490 FOR N=1 TO 5 STEP 3 ! PROMP
     T SETUP
3500 ! SEE PAGE F-3 IN 3421A MAN
     UAL FOR COMMANDS
3510 DISP S2$[16+N,16+N];" " @ I
     NPUT R$
3520 IF LEN(R$)#1 THEN R$=R$[1,1
     ] ! FORMAT
3530 S2$[17+N,17+N]=R$[1,1]
3540 NEXT N
3550 FOR N=7 TO 12 STEP 3 ! PROM
     PT SETUP
3560 DISP S2$[16+N,17+N];"=" @ I
     NPUT R$
3570 IF LEN(R$)#2 THEN R$=R$[1,1
     ]&" " ! FORMAT
3580 S2$[17+N,18+N]=R$[1,2]
3590 NEXT N
3600 DISP S2$[29,30];"=" @ INPUT
     R$
3610 IF LEN(R$)#2 THEN R$=R$[1,1
     ]&" " ! FORMAT
3620 S2$[31,32]=R$[1,2]
3630 GOSUB 2900 ! STATUS
3640 S1$=S2$[1,64]&S1$[65,237]
3650 PRINT# 1,R1 ; S1$ ! SAVE SE
     T
3660 OUTPUT 901 ;S2$[17,32]
3670 GOSUB 2900 ! STATUS
3680 CLEAR @ KEY LABEL @ RETURN
3685 !
3690 CLEAR @ BEEP @ DISP "FUNCTI
     ON NOT AVAILABLE" @ GOTO 54
     0
3700 !
3710 ! DECODE 5335A OFFSET,NORMA
     LIZE AND SCALE CONSTANTS
3720 S8$=" " ! AVOIDS NULL WARN
3730 FOR N=71 TO 94 ! STAT BYTE
     #
3740 S5$=DTB$(NUM(S1$[N,N])) ! B
     IN
3750 S6$=VAL$(BTD(S5$[9,12])) !
     LSE
3760 S7$=VAL$(BTD(S5$[13,16])) !
     MSE
3770 IF (N=71 OR N=79 OR N=87) A
     ND S6$="9" THEN S8$=S8$&"-"
     @ GOTO 3860
3780 IF (N=71 OR N=79 OR N=87) A
     ND S6$="0" THEN S8$=S8$&"+"
     @ GOTO 3860
3790 IF N=72 OR N=80 OR N=88 THE
     N S8$=S8$&S6$&"."&S7$ @ GOT
     O 3860
3800 IF N=77 OR N=85 OR N=93 THE
     N S8$=S8$&S6$ @ GOTO 3860
3810 IF (N=78 OR N=86 OR N=94) A
     ND S6$="15" THEN GOTO 3840
3820 IF (N=78 OR N=86 OR N=94) A
     ND S6$="0" THEN GOTO 3850
```

```
3830 S8$=S8$&S6$&S7$ @ GOTO 3860
3840 S7$=VAL$(16-VAL(S7$)) @ S8$
     =S8$&"E-"&S7$ @ GOTO 3860
3850 S8$=S8$&"E+"&S7$
3860 NEXT N
3870 RETURN
3880 !
3890 ! CHANGE QC2000 FRONT PNL
3900 GOSUB 1100 ! FORMAT&SEARCH
3910 OFF KEY# 2
3920 OFF KEY# 3
3930 OFF KEY# 4
3940 ! POLL FOR STATUS
3950 SET TIMEOUT 9;10000
3960 ON TIMEOUT 9 GOTO 1090
3970 P=SPOLL(904)
3980 IF P#0 THEN RETURN
3990 GOSUB 5580 ! CHK STATUS
4000 GOSUB 5710 ! UNLOCK
4010 OUTPUT 903 ;"DR0"
4020 DISP "CHANGE FRONT PANEL AS
     DESIRED";"THEN PRESS K1"
4030 ON KEY# 1,"STORE" GOTO 4070
4040 ON KEY# 8," QUIT " GOTO 438
     0
4050 KEY LABEL
4060 GOTO 4060 ! WAIT FOR SETKEY
4070 CLEAR
4080 GOSUB 5580 ! UPLOAD SETTING
4090 GOSUB 5660 ! LOCKOUT
4100 GOSUB 5660 ! LOCKOUT
4110 GOSUB 4390 ! STORE ON TAPE
4120 S4$=S2$
4130 GOSUB 5300 ! PGM UNIT (BLK)
4140 GOSUB 4480 ! AGC
4150 RETURN
4160 !
4170 ! PRINT SERIAL STATUS BYTE
4180 PRINT "SPOLL STATUS BYTE";D
     TB$(P) @ RETURN
4190 !
4200 ! PRINT UNIT STATUS BYTES
4210 FOR N=200 TO 256
4220 B1$=DTB$(NUM(S2$[N,N]))
4230 H1$=DTH$(NUM(S2$[N,N]))
4240 PRINT "BYTE";N;" = ";B1$[9,1
     6],"  =  ";H1$[3,4];"H = ";CH
     R$(NUM(S2$[N,N]))
4250 NEXT N
4260 KEY LABEL @ RETURN
4270 !
4280 ! QC2000 PGM BYTE PRINT
4290 GOSUB 1100 ! FORMAT&SEARCH
4300 GOSUB 5580 ! PRESENT SETTIN
     G
4310 ON ERROR GOTO 4330 ! EOF
4320 READ# 1,R1 ; S1$
4330 OFF ERROR @ S1$[238,238]="#
     "
4340 S2$=S1$[129,237]&S2$[110,25
     6] ! UPDATE CONFIGURATION
4350 GOSUB 1660 @ PRINT "ULTRASO
     NIC DATABASE" " " QC2000 M
     ANUAL FOR CODE  +.7." @ PRI
     NT
4360 FOR N=1 TO 256
4370 GOTO 4220 ! DECODE & PRINT
4380 RETURN
4390 !
4400 ! STORE ON TAPE
4410 S1$[129,237]=S2$[1,109]
4420 PRINT# 1,R1 ; S1$
4430 READ# 1,R1 ; S1$ ! VERIFY
4440 !
4450 ! ERROR NOTIFICATION
4460 IF S2$[1,109]#S1$[129,237]
     THEN PRINT "STORAGE ERROR"
     @ PRINT "S2$ = ",S2$ @ PRIN
     T "S1$ = "
4470 RETURN
4480 !
4490 ! AUTO GAIN CTL FOR QC2000
4520 OUTPUT 903 ;"DR0"
4530 GOSUB 4910 ! BIT MASKS
4540 G0=80-G1(1) ! GAIN:60dB
4550 S1$[128+46,128+46]=CHR$(B1(
     1)) @ S1$[128+47,128+47]=CH
     R$(B1(2))
4560 FOR M=3 TO 25 STEP 2
4570 IOBUFFER S4$
4580 S4$=S1$[129,237]&S2$[110,25
     6] ! UPDATE CONFIGURATION
4590 S4$[46,46]=CHR$(BINIOR(B1(M
     ),NUM(S4$[46,46])))
4600 S4$[47,47]=CHR$(BINIOR(B1(M
     +1),NUM(S4$[47,47])))
4610 S3$[1,2]=S4$[46,47]
4620 GOSUB 5400 ! PGM MODULE
4630 IF G1(M)=1 THEN WAIT 1000
4640 IF G1(M)=.5 THEN WAIT 1000
4650 GOSUB 5070 ! SIG LEVEL
4660 IF FLAG(1) THEN S1$[128+46,
     128+47]=S3$[1,2] @ G0=G0-G1
     (M)
4670 ! DISP S1$[128+46,128+47],S
     3$;G1(M),G0
4680 NEXT M
4690 IOBUFFER S4$
4700 S4$=S1$[129,237]&S2$[110,25
     6] ! FINAL GAIN SELECTED
4710 GOSUB 5400 ! PGM MODULE
4720 RETURN
4730 !
4740 ! SET SCREEN
4750 GOSUB 5070 ! SAMPLE
4760 S1$[128+35,128+36]="△◁"
4770 S1$[128+7,128+8]="△◁"
4780 IOBUFFER S4$
4790 S4$=S1$[129,237]&S2$[110,25
     6] ! FINAL CONFIGURATION
4800 GOSUB 5400 ! FINAL SETUP
4810 RETURN
4820 !
4830 ! SET SCREEN
4840 GOSUB 5070 ! SAMPLE
4850 GOSUB 5760 ! SWEEP LEGNTH
4860 GOSUB 5810 ! BLOCK DELAY
4870 IOBUFFER S4$
4880 S4$=S1$[129,237]&S2$[110,25
     6] ! FINAL CONFIGURATION
4890 GOSUB 5400 ! FINAL SETUP
4900 RETURN
4910 !
4920 ! DEFINE BIT MASKS
4930 B1(3)=BTD("01000000") @ B1(
     4)=BTD("00000000") @ G1(3)=
     16 ! 16 dB
4940 B1(5)=BTD("00100000") @ B1(
     6)=BTD("00000000") @ G1(5)=
     16 ! 16 dB
4950 B1(9)=BTD("00010000") @ B1(
     10)=BTD("00000000") @ G1(9)
     =8 ! 08 dB
4960 B1(1)=BTD("00000000") @ B1(
     2)=BTD("00100000") @ G1(1)=
     20 ! 20 dB
4970 B1(7)=BTD("00000000") @ B1(
     8)=BTD("00010000") @ G1(7)=
     10 ! 10 dB
4980 B1(11)=BTD("00000000") @ B1
     (12)=BTD("00000001") @ G1(1
     1)=16 ! 16 dB
4990 B1(13)=BTD("00000000") @ B1
     (14)=BTD("00000010") @ G1(1
     3)=8 ! 08 dB
5000 B1(15)=BTD("00000000") @ B1
     (16)=BTD("00000100") @ G1(1
     5)=4 ! 04 dB
```

```
5010 B1(17)=BTD("00000000") @ B1
     (18)=BTD("00001000") @ G1(1
     7)=2 ! 02 dB
5020 B1(19)=BTD("00001000") @ B1
     (20)=BTD("00000000") @ G1(1
     9)=4 ! 04 dB
5030 B1(21)=BTD("00000100") @ B1
     (22)=BTD("00000000") @ G1(2
     1)=2 ! 03 dB
5040 B1(23)=BTD("00000010") @ B1
     (24)=BTD("00000000") @ G1(2
     3)=1 ! 01 dL
5050 B1(25)=BTD("00000001") @ B1
     (26)=BTD("00000000") @ G1(2
     5)=.5 ! .5 dB
5060 RETURN
5070 !
5080 ! CHECK FOR SIGNAL LEVEL
5090 SET TIMEOUT 9,200
5100 ON TIMEOUT 9 GOTO 5250
5110 M2=0 @ N2=0
5120 OUTPUT 903 ;"WA1" @ ENTER 9
     03 ; M1$
5130 IOBUFFER 1>$
5140 TRANSFER        M1$ FHS
5150 FOR N=1 T
5160 SFLAG 1
5170 M0(N)=VAL(M1$   (N-1)+2,21
     *(N-1)+19])
5180 IF M0(N)>M6 THEN M2=M2+M0(N
     ) @ N2=N2+1 ELSE CFLAG 1 !
     NO SIG
5200 NEXT N
5210 OUTPUT 903 ;"WA0"
5215 IF N2=0 THEN N2=1
5220 M2=M2/N2
5230 SEND 9 ; UNT
5240 RETURN
5250 !
5260 ! LOST SIGNAL ON 5335
5270 ABORTIO 9
5280 CFLAG 1
5290 RETURN
5300 !
5310 ! STORE NE  SETUP
5320 IOBUFFER S
5330 S4$=S1$[12    237]&S2$[110,25
     6] ! UPDAT  ONFIGURATION
5340 GOSUB 5400    PGM
5350 GOSUB 5470 ! STORE IN #1
5360 GOSUB 55    ! RECALL #1
5370 GOSUB 5580 ! CRNT SET
5380 IF S2$[1,109]#S1$[129,237]
     THEN GOSUB 4440
5390 RETURN
5400 !
5410 ! SEND PGM MODULE COMMAND
5420 S4$=S4$[1,254] ! <CR>&<LF>
5430 SEND 9 ; MTA UNL LISTEN 4 D
     ATA HTD("C1"),HTD("0F"),HTD
     ("C7")
5440 TRANSFER S4$ TO 904 FHS
5450 P=SPOLL(904) @ WAIT 100
5460 RETURN
5470 !
5480 ! STORE IN BLOCK 1
5490 SEND 9 ; MTA UNL LISTEN 4 D
     ATA HTD("C4"),HTD("01"),HTD
     ("00")
5500 WAIT 2500
5510 P=SPOLL(904)
5520 RETURN
5530 !
5540 ! RECALL SETUP
5550 SEND 9 ; MTA UNL LISTEN 4 D
     ATA HTD("C3"),HTD("01"),HTD
     ("00")
5560 P=SPOLL(904) @ WAIT 100
5570 RETURN
5580 !
5590 ! GET SETTING #1
5600 IOBUFFER S2$
5610 SEND 9 ; MTA UNL LISTEN 4 D
     ATA HTD("C2"),HTD("00"),HTD
     ("00")
5620 TRANSFER 904 TO S2$ FHS
5630 ! DISP S2$
5640 P=SPOLL(904) @ IF P#0 THEN
     GOSUB 4440
5650 RETURN
5660 !
5670 ! LOCKOUT FRONT PANEL
5680 SEND 9 ; MTA UNL LISTEN 4 D
     ATA HTD("C7"),HTD("45"),HTD
     ("00")
5690 P=SPOLL(904)
5700 RETURN
5710 !
5720 ! LOCKOUT FRONT PANEL
5730 SEND 9 ; MTA UNL LISTEN 4 D
     ATA HTD("C7"),HTD("4A"),HTD
     ("00")
5740 P=SPOLL(904)
5750 RETURN
5760 !
5770 ! SET SWEEP LENGTH
5780 S1$[128+35,128+35]=CHR$(2)
5790 IF M2<.001 THEN S1$[128+36,
     128+36]=CHR$(0) ! INT((N4-
     2*M2)/(N4-N5)*255))
5800 RETURN
5810 !
5820 ! SET BLK DELAY TO CNTR SIG
5830 T6=IP((M2-.000025)/(4*.0000
     128))
5840 T5=IP((M2-.000025-4*.000012
     8*T6)/(4*.00000005))
5850 S1$[128+8,128+8]=CHR$(T6)
5860 S1$[128+7,128+7]=CHR$(T5)
5870 RETURN
5880 !
10   !       "TCC704" FROM CALT04
20   !       07208809201062987!020
30   CLEAR
40   DISP "STATIC TESTING ROUTINE
     "
50   BEEP 50,300
60   WAIT 3000
70   CLEAR
80   ENABLE KBD BTD("01100001")
90   !
100  DIM B1$[16],C$[8],H1$[4]
110  DIM M$[210],M1$[218]
120  DIM P1$[29],P2$[2]
130  DIM R$[16]
140  DIM S1$[264],S2$[264],S3$[2]
     ,S4$[264],S5$[16]
150  DIM T1$[1]
160  !
170  ! B1$=BINARY EQUIV OF STRING
180  ! C $=ASCII CLOCK DISPLAY
190  ! H1$=HEX EQUIV OF STRING
200  ! M $=MEAS SAMPLE (SECONDS)
210  ! M1$=100 MEAS SAMPLE STRG
220  ! F1$=P/N MEMORY
230  ! P2$=P/N INPUT
240  ! R $=RESPONSE TO INPUT ?
250  ! S1$=DATA TABLE FOR PART
260  ! S2$=INBOUND QC 2000 SETUP
270  ! S3$=2 CHR NS & GAIN
280  ! S4$=OUTBOUND QC SETUP
290  ! S5$=7 INCH FOR PRINT
300  ! T1$= X00 TEMP FLAG
310  !
320  DIM F    2 ,O(21),G1(26),H1(1
     6),I        (101),Q(17),S0(7)
```

```
    ,S1(7, : ,100),S3(100),T0(10
    )
330 !
340 ! B1(26)=BIN GAIN MASK ARRY
350 ! D(1)=ΣINCH FOR 100 RDG
360 ! D(2)=ΣTIME FOR 100 RDG
370 ! D(3)=ΣINCH² FOR 100 RDG
380 ! D(4)=ΣTIME² FOR 100 RDG
390 ! D(5-8)=SIM T9*100 RDG
400 ! D(9-12)=SIM L*T9*100 RDG
410 ! D(13)=σINCH FOR 100 RDG
420 ! D(14)=σTIME FOR 100 RDG
430 ! D(15)=σINCH T9*100 RDG
440 ! D(16)=σTIME T9*100 RDG
450 ! G1(26)=NUMERIC GAIN VALUE
460 ! H1(16)=HISTOGRAM BARS
470 ! I1(7)=LEGNTH SAMPLE AVG'S
480 ! M0(10)=NUM ARRAY OF MEAS
490 ! S0( =TIME AVG'S τ-UNCORR
500 ! S1( =TIME SAMPLE AVG'S
510 ! S2(1 )=μSEC HSTGM ARRAY
520 ! S3( )=TIME HSTGM ARRAY
530 ! T1(0 )=TEMP MEAS'MENTS
540 ! T1(1 =TEMP MEAS AVG
550 !
560 INTEGER C1,T5,T6,G1,G2,H,H0
    ,H1,L,L0,M,M5,N,N1,N2,N3,N4,N
    5,O4,P,P2,R0,R1,R2,T4,T8,T9,
    W1,X
570 REAL A0,A1,A2,A3,B,B0,G0,K,M
    2,M3,M6,O2,O3,T7,X1,X2,Y,Y1,
    Y2,Y3,Z
580 !
590 ! A0=CONST FOR RTD CONVERT
600 ! A1=CONST FOR RTD CONVERT
610 ! A2=CONST FOR RTD CONVERT
620 ! A3=CONST FOR RTD CONVERT
630 ! B =OFFSET FOR MATERIAL
640 ! B0=OFFSET FOR CALIPER
650 ! C1=HSTGRAM HEIGHT/OCCUR
660 ! D3=BLOCK DELAY INCR. 50nS
670 ! D4=BLOCK DLY INCR. 12.8μS
680 ! D9=+/- DELTA FOR ACCEPT
690 ! G0=RECEIVER GAIN
700 ! G1=MAX HISTOGRAM BARS
710 ! G2=HISTOGRAM BAR WIDTH
720 ! H =PRESENT HOUR
730 ! H0=HISTOGRAM BAR NUMBER
740 ! H1=HISTOGRAM BAR SAMPLES
750 ! K =SLOPE FOR MATERIAL
760 ! L0=TOTAL SAMPLE COUNTER
770 ! L =TRIAL SAMPLE COUNTER
780 ! M =GAIN MASK POINTER
790 ! M1=
800 ! M2=MEAS VALUE TOTALIZER
810 ! M3=MIN,AVG VALUE OF MEAS
820 ! M5=FINAL MEAS PLOT COORD
830 ! M6=SIGNAL TIME LIMIT (F1)
840 ! N =GEN. PURPOSE COUNTER
850 ! N1=POS PTR FOR P/N FORMAT
860 ! N2=GEN. PURPOSE COUNTER
870 ! N3=GEN. PURPOSE COUNTER
880 ! N4=GEN. PURPOSE COUNTER
890 ! N5=GEN. PURPOSE COUNTER
900 ! N6=GEN. PURPOSE COUNTER
910 ! O2=INTERVAL FOR TIME PLOT
920 ! O3=
930 ! O4=DIVISOR FOR LENGTH
940 ! P =RESULTS OF SER. POLL
950 ! P2=MAX # P/N IN DATABASE
960 ! R0=0 DEG F Ω FOR RTD
970 ! R1=REC POINTER FOR FPSDAT
980 ! R2=REC POINTER FOR FPSDES
990 ! T2=# OF TEMP (τ) SAMPLES
1000 ! T3=TEMP CORR S/(S-DEG.F)
1010 ! T4=
1020 ! T5=BLOCK DELAY INCR. 50nS
1030 ! T6=BLOCK DLY INCR. 12.8μS
1040 ! T7=STANDARD TEMP (300K)
1050 ! T8=TRIAL NUMBER COUNTER
1060 ! T9=SAMPLES PER TRIAL
1070 ! W1=WAIT FOR NEXT CYCLE
1080 ! X =HORIZONTAL PLOT COORD
1090 ! X1=SHRT CAL PT DISTANCE
1100 ! X2=LONG CAL PT DISTANCE
1110 ! Y =VERTICAL PLOT COORD
1120 ! Y1=SHORT CAL PT TIME
1130 ! Y2=LONG CAL PT TIME
1140 ! Y3=GRAPH OFFSET CONSTANT
1150 ! Z =Ω RATIO ACTUAL/R0
1160 !
1170 C1=4
1180 D(9)=0
1190 D(10)=0
1200 D(11)=0
1210 D(12)=0
1220 D9=.0000001
1230 G1=16
1240 G2=16
1250 H=0
1260 ! K=8.59251E-6!8.806946E-6
1269 L=1
1270 L0=0
1280 M6=.0095
1281 M8=.010000525
1282 M9=.0085
1290 N5=0
1300 O1=.05
1310 ! O1=-2.184!-1.93!-1.512*(1
     .105-.508)
1320 O2=.00001
1330 O3=0 ! -.000001
1340 P2=10
1350 T7=80.276
1360 T0(10)=0
1361 T6(8)=0
1370 ! T1(11)=.0083545
1380 ! T4=7
1390 !   .06821619287E-9
1400 !    .301308227
1410 !
1420 T9=3
1430 ! V .114958!117517!119887
1440 ! V2=106513!105000
1450 W1=51775
1460 X1=10.138
1470 X2=18.228
1480 Y3=0
1490 !
1500 SCALE 0,255,0,191
1510 PENUP
1520 ASSIGN# 1 TO "FPSDAT"
1530 ASSIGN# 2 TO "P/NDAT"
1540 ! GET DATABASE
1550 GOSUB 2970 ! FORMAT
1560 GOSUB 3000 ! CHECK
1570 READ# 1,R1 ; S1$
1580 T4=VAL(S1$[7,7])
1590 !
1600 ! SET EQUIP
1610 GOSUB 7420 ! GRAPH LABEL
1620 GOSUB 3860 ! RESET HPIB
1630 SET TIMEOUT 9;10000
1640 GOSUB 2240 ! LOAD 5335A
1650 GOSUB 2380 ! LOAD 3421A
1660 GOSUB 2520 ! LOAD OC3000
1670 GOSUB 3100 ! PRINT HEADER
1680 GOSUB 7560 ! CLR MEMS
1690 S1$[128+58,128+58]="4" @ O4
     =2 ! ECHO 1 TD%
1700 S1$[128+58,128+58]=" " @ O4
     =1 ! THRU 2 TD%
1710 GOSUB 1790 ! SET SNSRS
1720 GOSUB 2000 ! MEASRE
1730 GOSUB 3170 ! PRT AVGS
1740 ON KEY# 8," DONE " GOTO 177
     0
```

```
1750 KEY LABEL
1760 GOTO 1710
1770 GOSUB 3430 ! DONE
1780 GOTO 1670 ! NXT TRIAL
1790 !
1800 ! SET SNSRS
1810 X=X+1 @ PENUP @ YAXIS X @ P
     ENUP
1820 IF FP(T9/13)=0 OR X>230 THE
     N 7690
1830 CLEAR @ OFF KEY# 4
1840 DISP "SETUP SENSORS"
1850 W0=.0025 @ GOSUB 4810 ! SET
     SCN
1860 ON KEY# 1,"READY" GOTO 1890
1870 KEY LABEL @ BEEP 75,200 @ W
     AIT 100 @ BEEP 150,100
1880 GOTO 1880 ! WAIT
1890 OFF KEY# 1 @ CLEAR @ GOSUB
     4550 ! AGC
1900 W0=.000025 @ GOSUB 4900 ! S
     ET SCN
1901 GOSUB 5950 ! TEMP AVG
1902 IF T0(10)<70 OR T0(10)>90 T
     HEN BEEP @ WAIT 100 @ BEEP
     @ WAIT 100 @ BEEP @ WAIT 10
     0 @ BEEP @ WAIT 100
1903 PRINT USING "DD.DD,X" ; T0(
     0);T0(1);T0(2);T0(3);T0(4)
1904 PRINT USING "DD.DD,X" ; T0(
     5);T0(6);T0(7);T0(8);T0(10)
1910 BEEP 75,200 ! @CLEAR
1920 DISP "READY TO MEASURE"
1930 ON KEY# 1,"START" GOTO 1970
1940 ON KEY# 4,"RESET" GOTO 1830
1950 KEY LABEL
1960 GOTO 1960 ! WAIT
1970 OFF KEY# 1
1980 CLEAR
1990 RETURN
2000 !
2010 ! MEASURE
2020 OFF ERROR @ DISP "MEASURING
     "
2030 N6=0 @ D(5)=0 @ D(6)=0 @ D(
     7)=0 @ D(8)=0 @ S0=0
2040 D(17)=I1(0) @ D(18)=S1(0)
2050 FOR L=1 TO T9
2060 ! ON ERROR GOTO 2180 ! RECY
     CLE
2070 ! WAIT W1
2080 BEEP 140,200
2090 GOSUB 5950 ! TEMP AVG
2091 ! T0(10)=78.5@T1$=CHR$(14)
2100 GOSUB 6150 ! SMPL&WNDW
2110 GOSUB 6330 ! WINDOW
2120 IF M0(N2-1)>M6 OR M0(N4+1)<
     M9 THEN GOTO 2090 ! RETRY
2130 GOSUB 6670 ! GET N
2140 GOSUB 7220 ! PLOT RAW TIME
2141 GOSUB 3940 ! POSITION
2150 ! GOSUB 6790 ! PLOT INDIV T
2160 GOSUB 7280 ! PLOT AVG T
2170 GOSUB 7330 ! CHNG TO IN.
2180 GOSUB 3780 ! TIME&VALUE
2190 ! GOSUB 6340 ! PRINT RAW DA
     TA
2200 GOSUB 6440 ! HISTOGRAM
2210 IF H>H1 THEN PENUP @ PLOT X
     ,187 @ PLOT X,192 @ PENUP !
     PLOT X,Y ! MAKE HOUR MARK
2220 NEXT L
2230 RETURN
2240 !
2250 ! LOAD 5335A
2260 DISP "LOADING 5335A DATABAS
     E"
2270 ON TIMEOUT 9 GOTO 2340
2280 P=SPOLL(903) ! STATUS
2290 IF P=32 OR P=0 THEN 2300 EL
     SE 2370 ! SRQ,ERROR,FAIL
2300 OUTPUT 903 USING "#,2A,30A,
     2A,14A" ; "PB",S1$[65,94],"
     R1",S1$[95,108] ! PROGRAM
     5335A
2310 IF S1$[111,111]="#" THEN OU
     TPUT 903 ;S1$[109,118]
2320 DISP "5335 FRONT PANEL LOAD
     ED"
2330 RETURN
2340 !
2350 BEEP @ DISP "5335A NOT ON L
     INE" @ GOSUB 3860
2360 RETURN
2370 BEEP @ DISP "5335A REQUIRES
     SERVICE" @ RETURN
2380 !
2390 ! LOAD 3421A SETTINGS
2400 DISP "LOADING 3421A DATABAS
     E"
2410 ON TIMEOUT 9 GOTO 2470
2420 CLEAR 901
2430 P=SPOLL(901) ! STATUS
2440 IF P#1 THEN 2500
2450 DISP "3421A DATABASE LOADED
     "
2460 RETURN
2470 !
2480 BEEP @ DISP "3421A NOT ON L
     INE" @ GOSUB 3860
2490 RETURN
2500 !
2510 BEEP @ DISP "3421A REQUIRES
     SERVICE" @ RETURN
2520 !
2530 ! LOAD QC2000
2540 DISP "LOADING QC2000 DATABA
     SE"
2550 ! SET TIMEOUT 9;3000
2560 ! ON TIMEOUT 9 GOTO 1700
2570 !
2580 ON ERROR GOTO 2750
2590 GOSUB 5730 ! LOCKOUT
2600 GOSUB 5730 ! LOCKOUT
2610 GOSUB 5610 ! UP-LOAD #1
2620 GOSUB 5660 ! CRNT SETUP
2630 S1$[129,237]=S2$[1,109] ! I
     GNORE DATABASE-LOAD SETTING
     1
2640 ! S1$[128+58,128+58]=")" @
     O4=1 ! THRU & 2K DAMPING
2650 GOSUB 5380 ! STORE SETUP
2660 GOSUB 4550 ! AGC
2670 GOSUB 5150 ! SAMPLE
2680 GOSUB 5780 ! SWEEP LENGTH
2690 W0=.000025 @ GOSUB 5830 ! B
     LOCK DELAY
2700 GOSUB 5900 ! DIVISOR
2710 GOSUB 5380 ! STORE SETUP
2720 DISP "QC2000 DATABASE LOADE
     D"
2730 ! BEEP 915,75
2735 OFF ERROR
2740 RETURN
2750 !
2760 BEEP @ DISP "QC2000 NOT ON
     LINE" @ GOSUB 3860
2770 RETURN
2780 BEEP @ DISP "QC2000 REQUIRE
     S SERVICE"
2790 ! PRT STAT BYTES
2800 FOR N=1 TO 256
2810 B1$=DTB$(NUM(S2$[N,N])) ! B
     IN
2820 H1$=DTH$(NUM(S2$[N,N])) ! H
     EX
```

```
2830 PRINT USING 2840 ; N,B1$[9,
     12],B1$[13,16],H1$[3,4],S2$
     [N,N]
2840 IMAGE "BYTE ",DDD," = ",AAA
     A,AAAA," = ",AA,"H = ",A
2850 NEXT N
2860 RETURN
2870 !
2880 ! P/N FORMAT
2890 BEEP 50,50
2900 DISP "PART NUMBER" @ INPUT
     P2$
2910 P1$="00000000000000"
2920 N=14
2930 FOR N1=LEN(P2$) TO 1 STEP -
     1 ! BUILD R TO L
2940 IF P2$[N1,N1]="-" THEN N=11
      @ GOTO 2970 ! SKIP "-"
2950 P1$[N,N]=P2$[N1,N1]
2960 N=N-1
2970 NEXT N1
2980 P2$=P1$
2990 RETURN
3000 !
3010 ! P/N CHECK/SEARCH
3020 FOR R2=1 TO P2
3030 P1=R2
3040 ON ERROR GOTO 3090
3050 READ# 2,R2 ; P1$
3060 IF P1$[1,14]=P2$[1,14] THEN
      OFF ERROR @ RETURN ! MATCH
      OSA
3070 NEXT R2
3080 !
3090 DISP "NOT IN DATABASE" @ OF
     F ERROR @ WAIT 3000 @ CHAIN
      "FPSMOD"
3100 !
3110 ! PRINT HEADER
3120 PRINT @ PRINT @ PRINT
3130 PRINT "TRIAL NUMBER: ";T8 @
      PRINT
3140 PRINT @ PRINT "PART NUMBER:
      ";P1$[1,11];"-";P1$[12,14]
3150 PRINT "DATE:   ";MDY$(DATE+2
     400000)
3160 RETURN
3170 !
3180 ! PRINT STATS
3190 FOR L=1 TO T9
3200 PRINT USING "DDDD.DDD,A,.DD
     DDDDDDD,A,.DDDDDDDDDD" ; I
     1(L);"=";S1(L);"=";S4(L)
3210 NEXT L
3220 D(9)=D(9)+D(5) @ D(10)=D(10
     )+D(6)
3230 D(11)=D(11)+D(7) @ D(12)=D(
     12)+D(8)
3240 D(15)=SQR(ABS(D(7)/N6-(D(5)
     /N6)^2))
3250 D(16)=SQR(ABS(D(8)/N6-(D(6)
     /N6)^2))
3260 I1(0)=D(5)/N6 @ S1(0)=D(6)/
     N6 @ S0=S0/N6
3270 GOSUB 7750 ! LEAST²
3280 IF Q(4)=2 THEN D(20)=S1(0)
3290 D(17)=I1(0)-D(17) @ D(18)=S
     1(0)-D(18) @ D(21)=D(21)+D(
     17)
3300 PRINT USING "AA,DDDD.DDD,A,
     .DDDDDDDDD,A,.DDDDDDDDDD" ;
      "X=",I1(0),"=";S1(0),"=";S0
3310 PRINT USING "AA,DDDD.DDDDDD
     ,A,.DDDDDDDDDDD" ; "σ=";D(
     15),"=";D(16)
3320 GOTO 3400 ! SKIP STATS
3330 IF Q(4)=2 THEN D(21)=0 @ GO
     TO 3400
3340 D(19)=(S1(0)-D(20))/((Q(4)-
     2)*Q1)
3350 PRINT USING "AAA,DDD.DDD,XX
     XXXXX,AAA,D.DDDDDDDDD" ; "
     ΔI=";D(17),"ΔS=";D(18)
3360 PRINT USING 3370 ; "ΣIt=";Q
     (2)-Q1,"ΣIm";D(21),"ΔI=";D(
     21)-(Q(2)-Q1)
3370 IMAGE AAAA,DD.DDD,X,AAAA,DD
     .DDD,X,AAA,DD.DDD
3380 PRINT @ PRINT USING "AAA,DD
     DDDDD.DDD,XX,AAAA.DDDD.DDD
     " ; "K =";D(16);"B=    ";Q(1
     7)
3390 PRINT USING "AAA,DDDDDDD.D
     D,X,AAA,DDDD.DDDDDDDDD" ; "
     KX=";1/D(19),"ΔX=";D(19)
3400 PRINT
3410 L0=L0+N6
3420 RETURN
3430 !
3440 DISP "DONE MEASURING"
3450 BEEP 20,500 @ WAIT 100 @ BE
     EP 20,500 @ WAIT 100 @ BEEP
      20,500
3460 X=X+1 @ PENUP @ YAXIS X @ P
     ENUP
3470 DISP "ANOTHER" @ INPUT R$
3480 IF R$#"Y" THEN GOSUB 35.. @
      GOTO 3730
3490 GOSUB 3520 @ GOSUB 7420 ! N
     EW GRAPH
3500 ! IF FP(T8/13)=0 OR X>230 T
     HEN GRAPH @ PRINT @ PRINT @
      PRINT @ COPY @ GOSUB 7780
      ! NEW GRAPH
3510 T8=T8+1 @ RETURN
3520 !
3530 ! PRINT GRAPHICS
3540 PRINT# 1,R1 ; S1$
3550 PRINT @ PRINT @ PRINT @ PRI
     NT
3560 GRAPH
3570 COPY
3580 GCLEAR @ YAXIS 0,10 @ XAXIS
      191 @ XAXIS 0,10 @ YAXIS 2
     55,5
3590 LDIR 0
3600 MOVE 42,180 @ LABEL "SEC)DS
     "
3610 MOVE 160,180 @ LABEL "IN H
     S"
3620 FOR N=1 TO 100
3630 PENUP @ PLOT N+20,5 @ PLOT
     N+20,S2(N)+5
3640 PENUP @ PLOT N+140,5 @ PLOT
      N+140,S3(N)+5
3650 NEXT N
3660 PRINT @ PRINT @ PRINT @ COP
     Y
3670 D(1)=SQR(D(11)/L0-(D(9)/L0)
     ^2)
3680 D(2)=SQR(D(12)/L0-(D(10)/L0
     )^2)
3690 PRINT @ PRINT USING "AAA,DD
     DD.DDD,XXX,3A,.DDDDDDDDD" ;
      "X: ";D(9)/L0;" = ";D(10)/
     L0
3700 PRINT USING "AAA,DDDD DDDDD
     D,3A,.DDDDDDDDDDD" ; "σ: "
     ,D(1);" = ";D(2)
3710 RETURN
3720 !
3730 ! CLOSE FILES AND EXIT
3740 ASSIGN# 1 TO * ! FPSDAT
3750 ASSIGN# 2 TO * ! FPSDES
3760 DISP "DONE"
3770 STOP
```

```
3780 !
3790 ! PRINT TIME & VALUE
3800 H1=H
3810 H=INT(TIME/3600) ! HOUR
3820 C$=HMS$(TIME)
3830 IF T1$=CHR$(14) THEN PRINT
     USING 3840 ; C$,"↑",G0,"X",
     I1(L),T1$,T0(10),"σ",S5$,"R
     .",S3$
3840 IMAGE AAAAA,A,DD.D,A,DDDD.D
     DD,A,DD.DD,A,AAA,A,AA
3850 RETURN
3860 !
3870 ! RESET HPIB
3880 ABORTIO 9
3890 SEND 9 ; UNT
3900 RESET 9
3910 CLEAR 9
3920 WAIT 5000
3930 RETURN
3940 !
3950 ! GRAPH POSIT
3960 X=X+1 @ IF X>256 THEN GOSUB
     4000 ! X SHFT
3970 Y=(S1(L)-Y3)*20000000 ! Δ
3980 IF Y>200 OR Y<0 THEN GOSUB
     4110 ! Y SHFT
3990 RETURN
4000 !
4010 ! X PRT%SHFT
4020 PRINT @ PRINT
4030 GRAPH
4040 COPY
4050 GCLEAR
4060 PENUP
4070 PRINT @ PRINT
4080 PRINT "MIN VALUE=" Y3
4090 X=X-256
4100 RETURN
4110 !
4120 ! Y SHFT
4130 Y3=02*INT(S1(L)/02)+03
4140 Y=(S1(L)-Y3)*20000000
4150 PRINT "MIN VALUE=";Y3
4160 RETURN
4170 !
4180 ! .000385 RTD-C
4190 IF T0(N)>390.26 OR T0(N)<18
     .49 THEN T0(N)=-9.E99 @ RET
     URN ! MIN/MAX TEMP
4200 R0=100 ! STD TEMP
4210 Z=T0(N)/R0
4220 IF Z<1 THEN 4270 ! T<0 C
4230 A1=3367.82144089
4240 A2=13065764.8633
4250 A3=-1733543.60565
4260 T0(N)=A1-SQR(A2+A3*Z) @ GOT
     O 4320
4270 A0=-241.996759172
4280 A1=222.560617915
4290 A2=25.2488238815
4300 A3=-5.81268262546
4310 T0(N)=A0+Z*(A1+Z*(A2+Z*A3))
4320 !
4330 ! C-F
4340 T0(N)=9*(T0(N)/5)+32
4350 RETURN
4360 !
4370 ! INDIV TEMP
4380 FOR N=0 TO T4
4390 GOSUB 4170 ! Ω-F
4400 NEXT N
4420 ! SEE 1900
4430 RETURN
4440 !
4450 ! INDIV TEMP PLOT
4460 FOR N=0 TO T4
4470 T0(N)=200*FP(T0(N))
4480 PENUP
4490 PLOT X,T0(N)
4500 IF INT(T0(N))=0 OR INT(T0(N
     ))=1 THEN LABEL VAL$(N)
4510 PENUP
4520 NEXT N
4530 ! PLOT X,Y
4540 RETURN
4550 !
4560 ! AUTOGAIN-QC2000
4570 SET TIMEOUT 9;200
4580 ON TIMEOUT 9 GOTO 5310
4590 OUTPUT 903 ;"DR0"
4600 GOSUB 4990 ! BIT MASK
4610 G0=80-G1(3) ! GAIN:60 '
4620 ! G0=80 ! GAIN:80dB
4630 S1$[128+46,128+46]=CHR$(B1(
     1)) @ S1$[128+47,128+47]=CH
     R$(B1(2))
4631 S1$[128+46,128+46]=CHR$(B1(
     3)) @ S1$[128+47,128+47]=CH
     R$(B1(4))
4640 FOR M=5 TO 25 STEP 2
4650 ! FOR M=1 TO 25 STEP 2
4660 IOBUFFER S4$
4670 S4$=S1$[129,237]&S2$[110,25
     6] ! UPDATE
4680 S4$[46,46]=CHR$(BINIOR(B1(M
     ),NUM(S4$[46,46])))
4690 S4$[47,47]=CHR$(BINIOR(B1(M
     +1),NUM(S4$[47,47])))
4700 S3$[1,2]=S4$[46,47]
4710 GOSUB 5480 ! PGM
4720 IF G1(M)=1 THEN WAIT 1000
4730 IF G1(M)=.5 THEN WAIT 1000
4740 GOSUB 5150 ! SIG LEVEL
4750 IF FLAG(1) THEN S1$[128+46,
     128+47]=S3$[1,2] @ G0=G0-G1
     (M)
4760 NEXT M
4770 IOBUFFER S4$
4780 S4$=S1$[129,237]&S2$[110,25
     6] ! FINAL GAIN
4790 GOSUB 5480 ! PGM
4800 RETURN
4810 !
4820 ! SET SCREEN
4830 GOSUB 5150 ! SAMPLE
4840 S1$[128+35,128+36]="Δ◀"
4850 W0=.0025 @ GOSUB 5830 ! CNT
     R SIG
4860 IOBUFFER S4$
4870 S4$=S1$[129,237]&S2$[110,25
     6] ! FINAL
4880 GOSUB 5480 ! FINAL SETUP
4890 RETURN
4900 !
4910 ! SET SCREEN
4920 GOSUB 5150 ! SAMPLE
4930 GOSUB 5780 ! SWEEP LEGNTH
4940 GOSUB 5830 ! BLOCK DELAY
4950 IOBUFFER S4$
4960 S4$=S1$[129,237]&S2$[110,25
     6] ! FINAL
4970 GOSUB 5480 ! FINAL SETUP
4980 RETURN
4990 !
5000 ! DEFINE BIT MASKS
5010 B1(7)=HTD("40") @ B1(8)=HTD
     ("00") @ G1(3)=16 ! 16 dB
5020 B1(3)=HTD("20") @ B1(4)=HTD
     ("00") @ G1(5)=16 ! 16 dB
5030 B1(9)=HTD("10") @ B1(10)=HT
     D("00") @ G1(9)=8 ! 08 dB
5040 B1(1)=HTD("00") @ B1(2)=HTD
     ("20") @ G1(1)=20 ! 20 dB
5050 B1(5)=HTD("00") @ B1(6)=HTD
     ("10") @ G1(7)=10 ! 10 dB
```

```
5060 B1(11)=HTD("00") @ B1(12)=H
     TD("01") @ G1(11)=16 ! 16 d
     B
5070 B1(13)=HTD("00") @ B1(14)=H
     TD("02") @ G1(13)=8 ! 08 dB
5080 B1(15)=HTD("00") @ B1(16)=H
     TD("04") @ G1(15)=4 ! 04 dB
5090 B1(17)=HTD("00") @ B1(18)=H
     TD("08") @ G1(17)=2 ! 02 dB
5100 B1(19)=HTD("00") @ B1(20)=H
     TD("00") @ G1(19)=4 ! 04 dB
5110 B1(21)=HTD("04") @ B1(22)=H
     TD("00") @ G1(21)=2 ! 02 dB
5120 B1(23)=HTD("02") @ B1(24)=H
     TD("00") @ G1(23)=1 ! 01 dB
5130 B1(25)=HTD("01") @ B1(26)=H
     TD("00") @ G1(25)=.5 ! .5 d
     B
5140 RETURN
5150 !
5160 ! SIGNAL?
5170 SET TIMEOUT 9;150
5180 ON TIMEOUT 9 GOTO 5330
5190 M2=0 @ N2=0 @ M4=0
5200 OUTPUT 903 ;"WA1" @ ENTER 9
     03 ; M1$
5210 IOBUFFER M1$
5220 TRANSFER 903 TO M1$ FHS
5230 FOR N=1 TO 10
5240 SFLAG 1
5250 M0(N)=VAL(M1$[21*(N-1)+2,21
     *(N-1)+19])
5260 IF M0(N)<M6 THEN M2=M2+M0(N
     ) @ N2=N2+1 ELSE CFLAG 1 @
     M4=M4+M0(N) ! NO SIG
5280 NEXT N
5290 OUTPUT 903 ;"WA0"
5295 IF N2#10 THEN M7=M4/(10-N2)
      ELSE M7=M4
5296 IF M7=0 THEN M7=M8
5300 IF N2=0 THEN N2=1
5305 M2=M2/N2
5310 SEND 9 ; UNT
5320 RETURN
5330 !
5340 ! LOST IT-5335
5350 ABORTIO 9
5360 CFLAG 1
5370 RETURN
5380 !
5390 ! STORE SETUP
5400 IOBUFFER S4$
5410 S4$=S1$[129,237]&S2$[110,25
     6] ! UPDATE CONFIGURATION
5420 GOSUB 5480 ! PGM
5430 GOSUB 5550 ! STORE IN #1
5440 GOSUB 5610 ! RECA  #1
5450 GOSUB 5660 ! CRNT SET
5460 IF S2$[1,109]#S1$[129,237]
     THEN GOSUB 2780
5470 RETURN
5480 !
5490 ! PGM MODULE
5500 S4$=S4$[1,254] ! /CR>&<LF>
5510 SEND 9 ; MTA UNL LISTEN 4 D
     ATA HTD("C1"),HTD("0F"),HTD
     ("C7")
5520 TRANSFER S4$ TO 904 FHS
5530 P=SPOLL(904) @ WAIT 100
5540 RETURN
5550 !
5560 ! STORE-BLK 1
5570 SEND 9 ; MTA UNL LISTEN 4 D
     ATA HTD("C4"),HTD("01"),HTD
     ("00")
5580 WAIT 2600
5590 P=SPOLL(904)
5600 RETURN
5610 !
5620 ! RECALL
5630 SEND 9 ; MTA UNL LISTEN 4 D
     ATA HTD("C3"),HTD("01"),HTD
     ("00")
5640 P=SPOLL(904) @ WAIT 100
5650 RETURN
5660 !
5670 ! SETTING #1
5680 IOBUFFER S2$
5690 SEND 9 ; MTA UNL LISTEN 4 D
     ATA HTD("C2"),HTD("00"),HTD
     ("00")
5700 TRANSFER 904 TO S2$ FHS
5710 P=SPOLL(904) @ IF P#0 THEN
     GOSUB 2780
5720 RETURN
5730 !
5740 ! LOCK FRT PNL
5750 SEND 9 ; MTA UNL LISTEN 4 D
     ATA HTD("C7"),HTD("45"),HTD
     ("00")
5760 P=SPOLL(904)
5770 RETURN
5780 !
5790 ! SWP LENGTH
5800 S1$[128+35,128+35]=CHR$(2)
5810 IF M2<.001 THEN S1$[128+36,
     128+36]=CHR$(0) ! (113)!INT
     ((N4-.2*M2)/(N4-N5)*255))
5820 RETURN
5830 !
5840 ! BLK DELAY-CNTR SIG
5850 T6=IP((M2-W0)/(4*.0000128))
5860 T5=IP((M2-W0-4*.0000128*T6)
     /(4*.00000005))
5870 S1$[128+8,128+8]=CHR$(T6)
5880 S1$[128+7,128+7]=CHR$(T5)
5890 RETURN
5900 !
5910 ! DIVISOR-ECHO/THRU
5920 S3$=S2$[58,58]
5930 ! IF BIT(NUM(S3$),5) THEN O
     4=1 ELSE O4=2
5940 RETURN
5950 !
5960 ! TEMP AVG
5970 SET TIMEOUT 9,10000
5980 ON TIMEOUT 9 GOTO 6130
5981 ON ERROR GOTO 6142
5990 T0(10)=0 ! AVG TEMP CLEAR
6000 P=SPOLL(901)
6010 OUTPUT 901 ;S1$[1,32] ! MEA
     S
6020 FOR M=0 TO VAL(S1$[7,7]) !
     AVG
6030 ENTER 901 ; T0(M) ! T
6040 T0(10)=T0(10)+T0(M)
6050 NEXT M
6060 OUTPUT 901 ;"OPN",T4
6070 T0(10)=T0(10)/(T4+1)
6080 GOSUB 4360
6090 N=10 @ GOSUB 4170 ! mV-F
6100 IF L=1 THEN GOTO 6120
6110 ! IF FP(10*T0(13))<.01 OR F
     P(10*T0(10))>.99 THEN GOTO
     6310 ELSE GOTO 6130
6120 T1$=CHR$(14) @ RETURN
6130 !
6140 DISP "3421A NOT ON LINE" @
     RETURN
6142 DISP "TEMP SENSOR FAIL" @ R
     ETURN
6150 !
6160 ! 100 SAMPLES
6170 GOSUB 4550 ! AG
6180 GOSUB 4900 ! SCREEN
6190 BEEP 60,200
```

```
6200 OUTPUT 903 ;  ! @ ENTER 9
     03 ; M$
6210 SET TIMEOUT 9, .C
6220 ON TIMEOUT 9 GOTO 330 ! RE
     CYCLE
6230 IOBUFFER M$
6240 TRANSFER 903 TO M$ FHS
6250 SEND 9 ; UNT
6260 FOR N=1 TO 100
6270 M0(N)=VAL(M$[21*(N-1)+2,21*
     (N-1)+19]) ! NUM EQUIV
6280 NEXT N
6290 OUTPUT 903 ;"WA0"
6300 BEEP 80,200
6310 OFF ERROR
6320 RETURN
6330 !
6340 ! WITHIN D9 WINDOW
6350 M0(0)=INF @ M0(101)=EPS
6360 FOR N=1 TO 100
6370 IF M0(N)<M0(0) THEN M0(0)=M
     0(N)
6380 IF M0(N)>M0(101) THEN M0(10
     1)=M0(N)
6390 NEXT N
6400 ! IF M0(0)>MS THEN GOTO 203
     0
6410 IF M0(101)-M0(0)<D9 THEN 64
     40
6420 N4=0 @ N2=101
6430 RETURN
6440 !
6450 ! BUBBLE SORT
6460 FOR N=1 TO 99
6470 M3=M0(N)
6480 N3=N
6490 FOR N2=N+1 TO 100
6500 IF M0(N2)<M3 THEN M3=M0(N2)
     @ N3=N2 ! CHECK FOR LOWER
6510 NEXT N2
6520 M0(N3)=M0(N) @ M0(N)=M3 ! S
     WAP
6530 NEXT N
6540 !
6550 ! MEDIAN IS OK
6560 M3=(M0(50)+M0(51))/2
6570 ! OK SAMPLE-MIN
6580 FOR N4=49 TO 1 STEP -1
6590 IF M3-M0(N4)>D9 THEN GOTO 6
     610
6600 NEXT N4
6610 !
6620 ! OK SAMPLE-MAX
6630 FOR N2=52 TO 100
6640 IF M0(N2)-M3>D9 THEN RETURN
6650 NEXT N2
6660 RETURN
6670 !
6680 ! $\bar{x}$ & $\sigma$ (AVG & STD. DEVIATION)
6690 D(1)=0 @ D(2)=0 @ D(3)=0 @
     D(4)=0 @ S4(0)=0
6700 FOR N3=N4+1 TO N2-1
6720 M2=M0(N3)-(M7-M8)+(M0(N3)-(
     M7-M8))*T3*(T7-T0(10)) ! T
     CORRECTION
6730 M1=(M2-B)/(K*04) ! S-IN
6740 D(2)=D(2)+M2 @ D(4)=D(4)+M2
     ^2
6750 D(1)=D(1)+M1 @ D(3)=D(3)+M1
     ^2
6760 S4(0)=S4(0)+M0(N3)
6770 NEXT N3
6780 N5=N2-N4-1
6790 N6=N6+N5
6800 !
6810 D(13)=SQR(ABS(D(3)/N5-(D(1)
     /N5)^2))
6820 D(14)=SQR(ABS(D(4)/N5-(D(2)
     /N5)^2))
6830 IF N5=100 THEN S3$="**" ELS
     E S3$=VAL$(N5)
6840 IF D(13)>999 THEN S5$="***"
      ELSE S5$=VAL$(.000001*IP(1
     000000000*D(13)))
6850 D(5)=D(5)+D(1) @ D(7)=D(7)+
     D(3)
6860 D(6)=D(6)+D(2) @ D(8)=D(8)+
     D(4)
6870 S0=S0+S4(0)
6880 I1(L)=D(1)/N5 @ S1(L)=D(2)/
     N5 @ S4(L)=S4(0)/N5
6890 OUTPUT 903 ,"DR10I",S1(L)
6900 BEEP 100,200
6910 RETURN
6920 !
6930 ! RAW DATA PRINT
6940 GCLEAR @ PRINT
6950 GOSUB 6440 ! BUBBLE SORT
6960 FOR N=1 TO 99 STEP 3
6970 PRINT USING 6980 ; M0(N),M0
     (N+1),M0(N+2)
6980 IMAGE .000000000," ",.00000
     0000," ",.000000000
6990 NEXT N
7000 PRINT USING " .000000000" ;
     M0(100)
7010 PRINT @ RETURN
7020 !
7030 ! PLOT HISTOGRAM
7040 XAXIS 1,G1 @ XAXIS 192,G1 @
      YAXIS 1,C1 @ YAXIS 256,C1
7050 GOSUB 6440 ! BUBBLE SORT
7060 FOR N=0 TO G1-1
7070 H1(N)=0
7080 NEXT N
7090 !
7100 FOR N=N4+1 TO N2-1
7110 H0=1000000000*(M0(N)-M0(1))
7120 IF H0>G1-1 THEN H0=G1-1
7130 H1(INT(H0))=H1(INT(H0))+1
7140 NEXT N
7150 !
7160 FOR N=1 TO G1
7170 MOVE G2*N-(G2-1),0 @ DRAW G
     2*N-(G2-1),C1/4*H1(N-1) @ IDR
     AW G2-1,0 @ DRAW G2*N,0
7180 NEXT N
7190 MOVE 12,60 @ LDIR 90 @ LABE
     L VAL$(M0(1))
7200 MOVE 253,60 @ LDIR 90 @ LAB
     EL VAL$(M0(1)+G1/1000000000
     )
7210 RETURN
7220 !
7230 ! GRAPH RAW TIME
7240 ! GOSUB 3940 ! POS'N
7250 ! PENUP
7260 ! PLOT X,Y
7270 ! RETURN
7280 !
7290 PENUP
7300 PLOT X,10*(T3(10)-70) ! AVG
      TEMP
7310 PENUP
7320 RETURN
7330 !
7340 S3(INT(100*FP(I1(L))))=S3(I
     NT(100*FP(I1(L))))+1
7350 S2(INT((S1(L)-Y3)/.0000001)
     )=S2(INT((S1(L)-Y3)/.000000
     1))+1
7360 M5=200*FP(I1(L))
7370 PENUP
7380 PLOT X,M5-1 @ PLOT X,M5+1
7390 PENUP
7400 ! PLOT X,Y
7410 RETURN
7420 !
```

```
7430 ! GRAPH LABEL
7440 GCLEAR @ LDIR 0
7450 XAXIS 0 @ XAXIS 191 @ YAXIS
     255
7460 FOR N=0 TO 192 STEP 20
7470 MOVE 1,N-3 @ LABEL VAL$(N/2
     00) @ MOVE 241,N-3 @ IF N<1
     20 THEN LABEL VAL$(70+N/10)
7480 NEXT N
7490 YAXIS 18,10 @ YAXIS 237,10
7500 LDIR 90 @ MOVE 10,65 @ LABE
     L "10"
7510 MOVE 10,84 @ LABEL "uS"
7520 MOVE 10,106 @ LABEL "or"
7530 MOVE 10,124 @ LABEL "IN"
7540 MOVE 251,110 @ LABEL MDY$(D
     ATE+2400000)
7550 X=22 @ RETURN
7560 !
7570 ! INITIALIZE
7580 FOR N=0 TO 100
7590 S2(N)=0 @ S3(N)=0
7600 NEXT N
7610 K=1/115195.9262 ! 11543218.
     6540993E-6
7620 ! B=K*-6.7 ! (1.85-8.7)!.78
     8511!(-.964062)!(-.993579)!
     1X1
7621 ! B=K*-9.5 ! .5X1
7622 BEEP @ CLEAR @ DISP "WEDGE
     SIZE (INCHES)" @ DISP "H.5X
     1, H1X1, 1X1, OR .5X1" @ IN
     PUT R$
7623 IF R$="H1X1" THEN B=1.45*K
7624 IF R$="1X1" THEN B=-(6.7*K)
7625 IF R$="H.5X1" THEN B=1.325*
     K
7626 IF R$=".5X1" THEN B=-(9.5*K
     )
7628 BEEP @ CLEAR @ DISP "HIGH L
     IMIT (INCHES)" @ INPUT M6@
     M6=M6*K+B
7629 BEEP @ CLEAR @ DISP "LOW LI
     MIT (INCHES)" @ INPUT M9@ M
     9=M9*K+B
7630 ! B=K*1.325
7640 B0=0 ! K*(-2.25)!2.895!3.02
     5
7650 Q(9)=0 @ Q(10)=0 @ Q(11)=0
     @ Q(12)=0 @ Q(21)=0 @ L0=0
7660 Q(3)=0 @ Q(4)=1 @ Q(5)=0 @
     Q(6)=0 @ Q(7)=0 @ Q(8)=0
7670 I1(0)=0 @ S1(0)=0
7672 FOR N=0 TO 9
7674 T0(N)=0
7676 NEXT N
7680 RETURN
7690 !
7700 ! COPY OFF TO PAPER
7710 GRAPH @ PRINT @ PRINT @ PRI
     NT @ COPY
7720 PRINT @ PRINT @ PRINT
7730 GOSUB 7420 ! NEW GRAPH
7740 RETURN
7750 !
7760 ! LEAST2 LINE
7770 Q(0)=S1(0) @ Q(5)=Q(5)+Q(0)
7780 Q(1)=Q(0)^2 @ Q(6)=Q(6)-Q(1
     )
7790 Q(7)=Q(7)+Q(2)
7800 Q(3)=Q(0)*Q(2) @ Q(8)=Q(8)-
     Q(3)
7810 Q(11)=-(Q(4)/Q(5))
7820 Q(12)=Q(8)*Q(11)
7830 Q(13)=Q(6)*Q(11)
7840 Q(14)=Q(7)+Q(12)
7850 Q(15)=Q(5)+Q(13) @ IF Q(15)
     =0 THEN Q(15)=EPS
7860 Q(16)=Q(14)/Q(15)
7870 Q(17)=(Q(7)-Q(5)*Q(16))/Q(4
     )
7880 Q(2)=Q(17)+Q1
7890 Q(4)=0
7900 RETURN
```

APPENDIX B

HARDWARE

The company that manufactures the ultrasonic equipment listed below has changed hands several times since 1984. In 1984, they were Automation Industries; in 1985 they became Automation Industries, Sperry Products Division; in 1987 they became Qualcorp, Automation/Sperry Division; and in March 1988 they were purchased by Stavely NDT Technologies and are now referred to as Stavely NDT Technologies.

| Part No. | Description | Manufacturer |
|---|---|---|
| 3056DL | Data Acquisition System | Hewlett Packard |
| 5335A | Universal Timer/Counter | Hewlett Packard |
| 85B | Personal Computer | Hewlett Packard |
| 22271 | Platinum RTD | RdF Corp. |

| Part No. | Description | Manufacturer |
|---|---|---|
| QC2000 | Ultrasonic Transceiver | Stavely NDT Technologies |
| 50D1029 | PR Buffer/Sweep | Stavely NDT Technologies |
| 50D1128 | System Timing | Stavely NDT Technologies |
| 50D1130 | Display Sequencer | Stavely NDT Technologies |
| 50D1140 | Front Panel Controller | Stavely NDT Technologies |
| 50D1141 | General Purpose Receiver | Stavely NDT Technologies |
| 50D1142 | General Purpose Pulser | Stavely NDT Technologies |
| 50D1143 | System Controller | Stavely NDT Technologies |
| 50D1153 | Mainframe | Stavely NDT Technologies |
| 50D1155 | A-scan Display | Stavely NDT Technologies |
| 50D1158 | Analog I/O | Stavely NDT Technologies |
| 50D1310 | Digital I/O | Stavely NDT Technologies |

The Hewlett Packard equipment was procured with most options factory-installed. A high stability time base (option 010), expanded HPIB control (option 040), and set of rear panel connectors (option C10) were included with the 5335A Timer. An advanced programming ROM (00085-15005), ROM drawer (82936A), and HPIB interface (82937A) were later added to the computer. The 3056DL Data Acquisition System was procured as a 3421A mainframe, software, and certain options including two ten-channel multiplexers with thermocouple reference and connector block (option 022), HPIB interface (option 201), deletion of the cabinet and locking drawer (option 400), and 120 Volt/60 Hz operation (option 326). The only part of the 3056DL software that was used was the routine for converting the RTD resistance values to temperature.

The ultrasonic transceiver mainframe (50D1153) was factory modified to provide convenient rear panel connections for the transmitting and receiving sensors (mod # 50K5889). The System Timing module (50D1128) was factory modified to provide a four-fold increase in the blocking delay and sweep delay ranges required for this application (mod # 50K5888). The Analog I/O (50D1158) is of no use in this application. Instead, the vertical display output signal coming directly from the mainframe (Y video input to the display) is tapped and fed to the timer where it is used to determine propagation time. The transducers are stock items.

The ultrasonic wedge (wedge 50) dimensions were based on Staveley NDT Technologies standard part number 57A9195 and similar parts. Optimization of surface wave propagation and detection required variation of angle and length. It also required close-tolerance machining of wedge angle.

What is claimed as invention is:
1. A method of measuring a subject surface length of a three-dimensional curvilinear body, the method comprising the steps of:
 (i) initially placing the transmitter a first distance from the receiver;
 (ii) generating a first surface wave on the surface of the body using the ultrasonic transmitter;
 (iii) detecting receipt of the first surface wave with the ultrasonic receiver;
 (iv) measuring the time period between generation of the first wave by the transmitter and detection of the first wave by the receiver;
 (v) moving the transmitter relative to the receiver a measured distance such that the transmitter is a second distance from the receiver;
 (vi) generating a second surface wave on the surface of the body using the ultrasonic transmitter;
 (vii) detecting receipt of the second surface wave with the ultrasonic receiver;
 (viii) measuring the time period between generation of the second wave by the transmitter and detection of the second wave by the receiver;
 (ix) determining the surface wave velocity by dividing the measured distance by the difference between the time period measured in step (viii) and the time period measured in step (iv); and
 (x) determining the subject surface length by multiplying the time period measured in step (iv) by the velocity determined in step (ix).

2. The method of claim 1, wherein the body to be measured is an enlarged cylindrical body, and the measurement is of the perimeter of the cylindrical body.

3. The method of claim 1, wherein the subject surface length exceeds 120 inches.

4. The method of claim 3, wherein the subject surface length exceeds 240 inches.

5. The method of claim 4, wherein the subject surface length exceeds 480 inches.

6. The method of claim 5, wherein the subject surface length exceeds 960 inches.

7. The method of claim 1, wherein the surface wave travels from the transmitter to the receiver without reflection.

8. A method of measuring a subject surface length of a three-dimensional curvilinear body, the method comprising the steps of:
 (i) initially placing the transmitter a first distance from the receiver;
 (ii) generating a first surface wave on the surface of the body using the ultrasonic transmitter;
 (iii) detecting receipt of the first surface wave with the ultrasonic receiver;
 (iv) measuring the time period between generation of the first wave by the transmitter and detection of the first wave by the receiver;
 (v) moving the transmitter relative to the receiver a measured distance such that the transmitter is a second distance from the receiver;
 (vi) generating a second surface wave on the surface of the body using the ultrasonic transmitter;
 (vii) detecting receipt of the second surface wave with the ultrasonic receiver;
 (viii) measuring the time period between generation of the second wave by the transmitter and detection of the second wave by the receiver;
 (ix) determining the first surface wave velocity by dividing the measured distance by the difference between the time period measured in step (viii) and the time period measured in step (iv);
 (x) moving the transmitter relative to the receiver an Nth measured distance such that the transmitter is an (N+1)th distance from the receiver;
 (xi) generating the Nth surface wave on the surface of the body using the ultrasonic transmitter;
 (xii) detecting receipt of the Nth surface wave with the ultrasonic receiver;
 (xiii) measuring the Nth time period between generation of the Nth wave by the transmitter and detection of the Nth wave by the receiver;
 (xiv) determining the Nth surface wave velocity by dividing the Nth measuring distance by the difference between the Nth and N−1)th time periods measured in step (xii); and
 (xv) repeating steps (x) through (xiv) a plurality of times such that the statistical result of the velocity values converges within a specified tolerance; and
 (xvi) determining the subject surface length by multiplying the time period measured in step (iv) by the statistical result of the velocity values determined in step (xv).

9. The method of claim 8, wherein the body to be measured is an enlarged cylindrical body, and the measurement is of the perimeter of the cylindrical body.

10. The method of claim 8, wherein the surface wave travels from the transmitter to the receiver without reflection.

11. The method of claim 8, wherein the subject surface length exceeds 120 inches.

12. The method of claim 11, wherein the subject surface length exceeds 240 inches.

13. The method of claim 12, wherein the subject surface length exceeds 480 inches.

14. The method of claim 13, wherein the subject surface length exceeds 960 inches.

* * * * *